(12) United States Patent
Jiang et al.

(10) Patent No.: US 11,790,709 B2
(45) Date of Patent: Oct. 17, 2023

(54) METHOD FOR CONTROLLING LOCKER BASED ON DELIVERY MESSAGE AND ELECTRONIC DEVICE

(71) Applicant: HUAWEI TECHNOLOGIES CO., LTD., Shenzhen (CN)

(72) Inventors: Shan Jiang, Nanjing (CN); Yuan Qing, Shenzhen (CN); Wen Zhang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/267,485

(22) PCT Filed: Aug. 27, 2018

(86) PCT No.: PCT/CN2018/102560
§ 371 (c)(1),
(2) Date: Feb. 9, 2021

(87) PCT Pub. No.: WO2020/041952
PCT Pub. Date: Mar. 5, 2020

(65) Prior Publication Data
US 2021/0209876 A1 Jul. 8, 2021

(51) Int. Cl.
*G07C 9/00* (2020.01)
*G06F 3/04842* (2022.01)
(Continued)

(52) U.S. Cl.
CPC ....... *G07C 9/00309* (2013.01); *G06F 3/0488* (2013.01); *G06F 3/04842* (2013.01);
(Continued)

(58) Field of Classification Search
CPC ..................................................... G07C 9/00
See application file for complete search history.

(56) References Cited

U.S. PATENT DOCUMENTS 9,558,608 B2 * 1/2017 Amdahl ............ G07C 9/00912
9,640,002 B1 5/2017 Grosberg
(Continued)

FOREIGN PATENT DOCUMENTS

CN 104778790 A 7/2015
CN 104954427 A 9/2015
(Continued)

OTHER PUBLICATIONS

Chinese Office Action dated Nov. 4, 2020 for Application No. 201880078652.3, 10 pages.
(Continued)

*Primary Examiner* — K. Wong

(57) ABSTRACT

Embodiments provide a method for controlling a locker based on a delivery message. In those embodiments, an electronic device obtains a delivery message of a first package that is sent by a server, where the delivery message includes pickup information of the first package and location information of a locker in which the first package is placed, and the pickup information is used to open a pickup box in which the first package is placed in the locker. The electronic device then determines a first area based on the location information, where the locker is located in the first area; and displays a pickup function item when it is detected that the electronic device enters the first area. Still in those embodiments, the electronic device sends a locker opening request to the server when it is detected that a user triggers the pickup function item.

20 Claims, 22 Drawing Sheets

(51) Int. Cl.
*G06F 3/0488* (2022.01)
*H04W 4/021* (2018.01)
*H04W 4/12* (2009.01)
*G07F 17/12* (2006.01)

(52) U.S. Cl.
CPC ..... *G07C 9/00817* (2013.01); *G07C 9/00896* (2013.01); *G07F 17/13* (2020.05); *H04W 4/021* (2013.01); *H04W 4/12* (2013.01); *G07C 2009/00325* (2013.01); *G07C 2009/00769* (2013.01); *G07C 2009/00841* (2013.01)

(56) References Cited

U.S. PATENT DOCUMENTS

| | | | | |
|---|---|---|---|---|
| 10,096,183 | B2* | 10/2018 | Nitu | G07F 9/001 |
| 10,964,142 | B2* | 3/2021 | Flynn | G06Q 20/203 |
| 11,069,169 | B2* | 7/2021 | Huang | G06F 16/2379 |
| 2015/0356801 | A1 | 12/2015 | Nitu et al. | |
| 2018/0225627 | A1 | 8/2018 | Jin | |

FOREIGN PATENT DOCUMENTS

| | | |
|---|---|---|
| CN | 105139537 A | 12/2015 |
| CN | 105225355 A | 1/2016 |
| CN | 105427066 A | 3/2016 |
| CN | 106776344 A | 5/2017 |
| CN | 106792584 A | 5/2017 |
| CN | 107134072 A | 9/2017 |
| CN | 107404711 A | 11/2017 |
| CN | 107610356 A | 1/2018 |
| CN | 107707667 A | 2/2018 |
| CN | 107730761 A | 2/2018 |
| CN | 107784722 A | 3/2018 |
| CN | 107918850 A | 4/2018 |
| CN | 108154329 A | 6/2018 |
| KR | 20160095552 A | 8/2016 |

OTHER PUBLICATIONS

Chinese Office Action dated May 28, 2021 for Application No. 201880078652.3, 9 pages.
European Search Report dated May 14, 2021 for Application No. 189315898.8, 8 pages.
PCT Search Report for Application No. PCT/CN2018/102560 dated Aug. 27, 2018, 10 pages.
Canadian Office Action for Application No. 3,107,526 dated Jan. 9, 2023, 4 pages.
Zheng Wenchao et al, Intelligent Express Delivery System Based on STM32, New Technologies and New Products in China, Issue 13, 2017, with the English Translatin, total 6 pages.
Chinese Notice of Allowance for Application No. 20188007862.3 dated Jul. 4, 2022, 5 pages.

* cited by examiner

METHOD FOR CONTROLLING LOCKER BASED ON DELIVERY MESSAGE AND ELECTRONIC DEVICE

CROSS-REFERENCE TO RELATED APPLICATIONS

This application is a national stage of International Application No. PCT/CN2018/102560, filed on Aug. 27, 2018, which is hereby incorporated by reference in its entirety.

TECHNICAL FIELD

This application relates to the terminal field, and in particular, to a method for controlling a locker based on a delivery message and an electronic device

BACKGROUND

Currently, when a courier delivers a package, there are mainly three manners of signing for the package. In a first manner, a recipient signs for the package. In a second manner, the package is signed for in a depositary. In a third manner, the package is signed for in a locker, to be specific, the courier places the package in the locker to wait for a recipient to pick up the package.

For example, a recipient may install an APP of a corresponding locker on a mobile phone, and use the APP to query dispatch information, delivery information, and the like of a package. After placing the package in the locker, a courier may upload related information (for example, recipient information, a locker code, and a delivery pickup code) of the package to a server of the APP. Further, the server may send the related information of the package to the mobile phone of the recipient. The mobile phone may push a delivery message of the package to be picked up to the recipient by using a message pushed by the APP, to remind the recipient of the information such as the locker in which the package is placed and the delivery pickup code.

However, in many scenarios, the recipient does not have a condition for picking up a package when receiving a delivery message pushed by the APP. For example, the recipient may be in a meeting, or the package is placed in a locker near home while the recipient is at work. Subsequently, if the recipient forgets the delivery message, the recipient cannot pick up the package in time, and consequently use efficiency of the locker is affected because the package stays in the locker for a long time.

SUMMARY

Various embodiments provide a method for controlling a locker based on a delivery message and an electronic device. Therefore, when a user has a package to be picked up, the user can be reminded in time to pick up the package from a locker, thereby improving usage efficiency of the locker.

In accordance with the present disclosure the following technical solutions are described:

According to a first aspect, a method for controlling a locker based on a delivery message is provided. The method can include: An electronic device obtains a delivery message of a first package that is sent by a server. The delivery message includes pickup information of the first package and location information of a locker in which the first package is placed, and the pickup information is used to open a pickup box in which the first package is placed in the locker. Further, the electronic device may determine a first area based on the location information. The locker is located in the first area. When it is detected that the electronic device enters the first area, it indicates that a user (that is, a recipient) is relatively close to the locker, and the electronic device may display a pickup function item. The electronic device may send a locker opening request to the server when it is detected that the user triggers the pickup function item. The locker opening request includes the pickup information of the first package, and the pickup information is used to open the pickup box in which the first package is placed in the locker.

In other words, when it is detected that the user is relatively close to the locker, there is a relatively small security risk at which a package is lost after the locker automatically opens a pickup box. Therefore, the electronic device may display a pickup function item, and after the user taps the pickup function item, the electronic device may request the server to remotely control the locker to automatically open the pickup box from which the package is to be picked up. This simplifies an operation procedure in which a recipient picks up a package by using a locker. Therefore, the user can pick up a package in a locker in time, thereby improving usage efficiency of the locker.

In one design method, the pickup function item may be a pickup button, and the pickup button may be located in a left-most screen, a lock screen, a message notification bar, a pull-up menu, or a drop-down menu.

In one design method, after it is detected that the electronic device enters the first area, the method further includes: The electronic device displays an automatic locker opening prompt if the electronic device does not display a locker opening interface. The locker opening interface includes the pickup function item. That the electronic device displays a pickup function item includes: The electronic device jumps to the locker opening interface when it is detected that the user enters a preset operation for the automatic locker opening prompt. In this way, when the electronic device does not display the locker opening interface, the user may jump to, by using the automatic locker opening prompt, the locker opening interface including the pickup function item, to implement a one-tap locker opening function.

In one design method, after the electronic device displays the pickup function item, the method further includes: When it is detected that the electronic device leaves the first area, the electronic device hides the pickup function item; or when it is detected that the electronic device leaves the first area, the electronic device sets the pickup function item to a state in which the electronic device cannot interact with the user. In this way, when the user is not close to the locker, the user cannot trigger the pickup button to implement the one-tap locker opening function, thereby avoiding a security risk caused by opening a corresponding pickup box in the locker when the user is relatively far away from the locker.

In one design method, after it is detected that the user enters the preset operation for the pickup function item, the method further includes: The electronic device obtains current location information of the electronic device. In this case, that the electronic device sends a locker opening request to the server includes: The electronic device sends the locker opening request to the server if the current location information of the electronic device is in the first area.

In other words, before the one-tap locker opening function is implemented, verification needs to be performed on a geographical location of the electronic device that sends the locker opening request. When the electronic device is relatively close to the locker that waits to be opened, there is a relatively low risk at which a package is lost when the locker is opened. In this case, the electronic device may send the locker opening request to the server. Alternatively, when a distance between the electronic device and the locker does not meet a preset condition, the electronic device does not need to send the locker opening request to the server, thereby ensuring security of a package to be picked up.

In one design method, after the electronic device obtains the current location information of the electronic device, the method further includes: The electronic device displays warning information if the current location information of the electronic device is outside the first area. The warning information is used to prompt the user with a risk of opening the pickup box in which the first package is located.

In one design method, after the electronic device obtains the delivery message of the first package that is sent by the server, the method further includes: The electronic device determines a range of a second area based on the location information. The locker is located in the second area. The second area includes the first area, or the second area is an area in a third area other than the first area. The first area is located in the third area. The electronic device may display a pickup reminder when it is detected that the electronic device enters the second area. The pickup reminder is used to prompt the user to pick up the first package, so as to prevent the user from forgetting to pick up the first package in the locker.

In one design method, after the electronic device displays the pickup reminder, the method further includes: When it is detected that the electronic device enters the second area again, the electronic device determines whether the pickup reminder is operated. If the pickup reminder is operated, it indicates that the user has viewed the pickup reminder, and the electronic device cease to display the pickup reminder, so as to prevent the user from being disturbed by repeatedly displaying the pickup reminder; or if the pickup reminder is not operated, the electronic device may display the pickup reminder again, to prompt the user to pick up the first package.

In one design method, after the electronic device obtains the delivery message of the first package that is sent by the server, the method further includes: The electronic device displays a pickup notification of the first package based on the delivery message.

In one design method, when it is detected that the electronic device enters the second area, the method further includes: The electronic device determines a time interval between a moment at which the pickup notification is displayed and a moment at which the electronic device enters the second area. That the electronic device displays a pickup reminder includes: If the time interval is greater than a preset value, the electronic device may display the pickup reminder; or if the time interval is less than or equal to the preset value, it indicates that the electronic device has displayed the pickup notification of the first package not long ago. In this case, the user may be disturbed if the pickup reminder of the first package is displayed. Therefore, the electronic device may display the pickup reminder after a preset time.

In one design method, the electronic device is provided with a function of a delivery card, and the delivery card is used to display a delivery message of a recipient that is registered by the user. After the electronic device displays the pickup notification of the first package based on the delivery message, the method further includes: When it is detected that the user enters a preset operation for the pickup notification, the electronic device jumps to an interface including the delivery card.

According to a second aspect, an electronic device is provided. The electronic device can include a touchscreen, a communications interface, a positioning apparatus, one or more processors, a memory, and one or more computer programs. The processor is coupled to the touchscreen, the communications interface, the positioning apparatus, and the memory. The one or more computer programs are stored in the memory. When the electronic device runs, the processor executes the one or more computer programs stored in the memory, so that the electronic device performs the method for controlling a locker based on a delivery message according to any one of the first aspect and the possible design methods of the first aspect.

According to a third aspect, a computer storage medium is provided, which can include a computer instruction. When the computer instruction is run on an electronic device, the electronic device is enabled to perform the method for controlling a locker based on a delivery message according to any one of the first aspect and the possible design methods of the first aspect.

According to a fourth aspect, this application provides a computer program product. When the computer program product is run on an electronic device, the electronic device is enabled to perform the method for controlling a locker based on a delivery message according to any one of the first aspect and the possible design methods of the first aspect.

It can be understood that the terminal in the second aspect, the computer storage medium in the third aspect, and the computer program product in the fourth aspect that are provided above are all configured to perform the corresponding method in accordance with the present disclosure. Therefore, for beneficial effects that can be achieved, refer to beneficial effects in the corresponding method provided above. Details are not described again herein.

DESCRIPTION OF EMBODIMENTS

The following describes the implementations of the embodiments in detail with reference to accompanying drawings.

Figure 1:
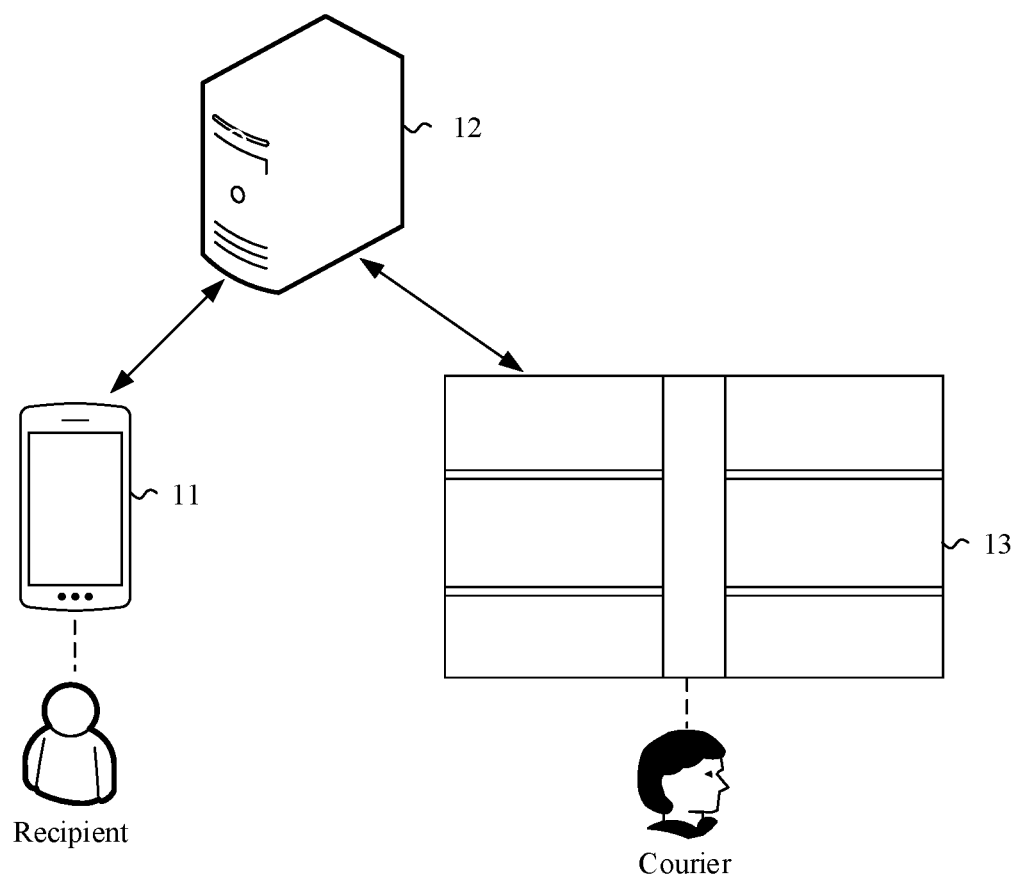
FIG. 1 is a schematic architectural diagram 1 of a delivery message system according to an embodiment.

A method for controlling a locker based on a delivery message provided in the embodiments may be applied to a delivery message system shown in FIG. 1. The system may include an electronic device 11, a server 12, and a locker 13. The electronic device 11 and the locker 13 each can establish a communication connection to the server 12. For example, the electronic device 11 (or the locker 13) may communicate with the server 12 through a wireless cellular network or a Wi-Fi network, and a communication protocol may be a protocol such as HTTP (Hyper Text Transfer Protocol, hypertext transfer protocol) or HTTPS (Hyper Text Transfer Protocol over Secure Socket Layer, hypertext transfer protocol over secure sockets layer). This is not limited in the embodiments of this application.

The locker 13 generally includes a plurality of pickup boxes. After a courier places a package A signed for on behalf of a recipient in a specific pickup box (for example, a pickup box 01), the courier may enter recipient information (for example, a mobile phone number of the recipient) of the package A and the like in the locker 13. Further, the locker 13 may generate a delivery pickup code used to pick up the package A from the pickup box 01. The delivery pickup code may include a digit and/or a character. Further, the locker 13 may send a delivery message of the package A to the server 12. The delivery message includes the recipient information and pickup information.

The recipient information is used to indicate an identity of the recipient. For example, the recipient information may include the mobile phone number of the recipient. Further, the recipient information may include an ID card number, a name, an address, or the like of the recipient. The pickup information is used to indicate related information required when the recipient picks up the package from the locker 13. For example, the pickup information may include an identifier of the locker 13 in which the package A is located, an identifier of the pickup box 01, and the delivery pickup code. In addition, the delivery message may further include information such as a logistics order number, logistics information, and contact details of a delivery company of the package A.

In some embodiments, in addition to reporting the delivery message to the server 12 by operating the locker 13, the courier may further report the delivery message to the server 12 by using a terminal such as a mobile phone. For example, the courier may install an APP related to package delivery on a mobile phone of the courier. After the courier places the package A in a specific pickup box (for example, the pickup box 01), the courier may open the APP, and enter the delivery message such as the recipient information and the pickup information in a related interface of the APP. Further, the mobile phone of the courier may send the delivery message of the package A to the server 12. Alternatively, after the courier places the package A in the pickup box 01 of the locker 13, the locker 13 may generate the pickup information of the package A and report the pickup information to the server. In addition, the courier may report the recipient information to the server by using the APP on the mobile phone of the courier, so that the server obtains the delivery message including the pickup information and the recipient information of the package A.

Usually, an electronic device 11 that subscribes to a delivery reminder service pre-registers a correspondence between recipient information (for example, a mobile phone number of a recipient) and the electronic device 11 (for example, an identifier of the electronic device 11) with the server 12. In other words, the server 12 maintains correspondences between different recipient information and different electronic devices 11. Therefore, after receiving the delivery message of the package A, the server 12 may obtain, through query based on the recipient information carried in the delivery message, a specific electronic device 11 to which the delivery message of the package A needs to be pushed. Further, the server 12 may send the delivery message of the package A to the determined electronic device 11.

In addition, in this embodiment, when sending the delivery message of the package A to the electronic device 11, the server 12 may further add, to the delivery message, location information of the locker 13 in which the package A is located. For example, the location information may be latitude and longitude information of the locker 13. For example, the server 12 stores location information of each locker 13. After receiving the delivery message of the package A, the server 12 may determine, based on the identifier of the locker 13 that is carried in the delivery message, the location information of the locker 13 in which the package A is placed, and then add the location information to the delivery message of the package A to push the delivery message of the package A to the electronic device 11.

Figure 2:
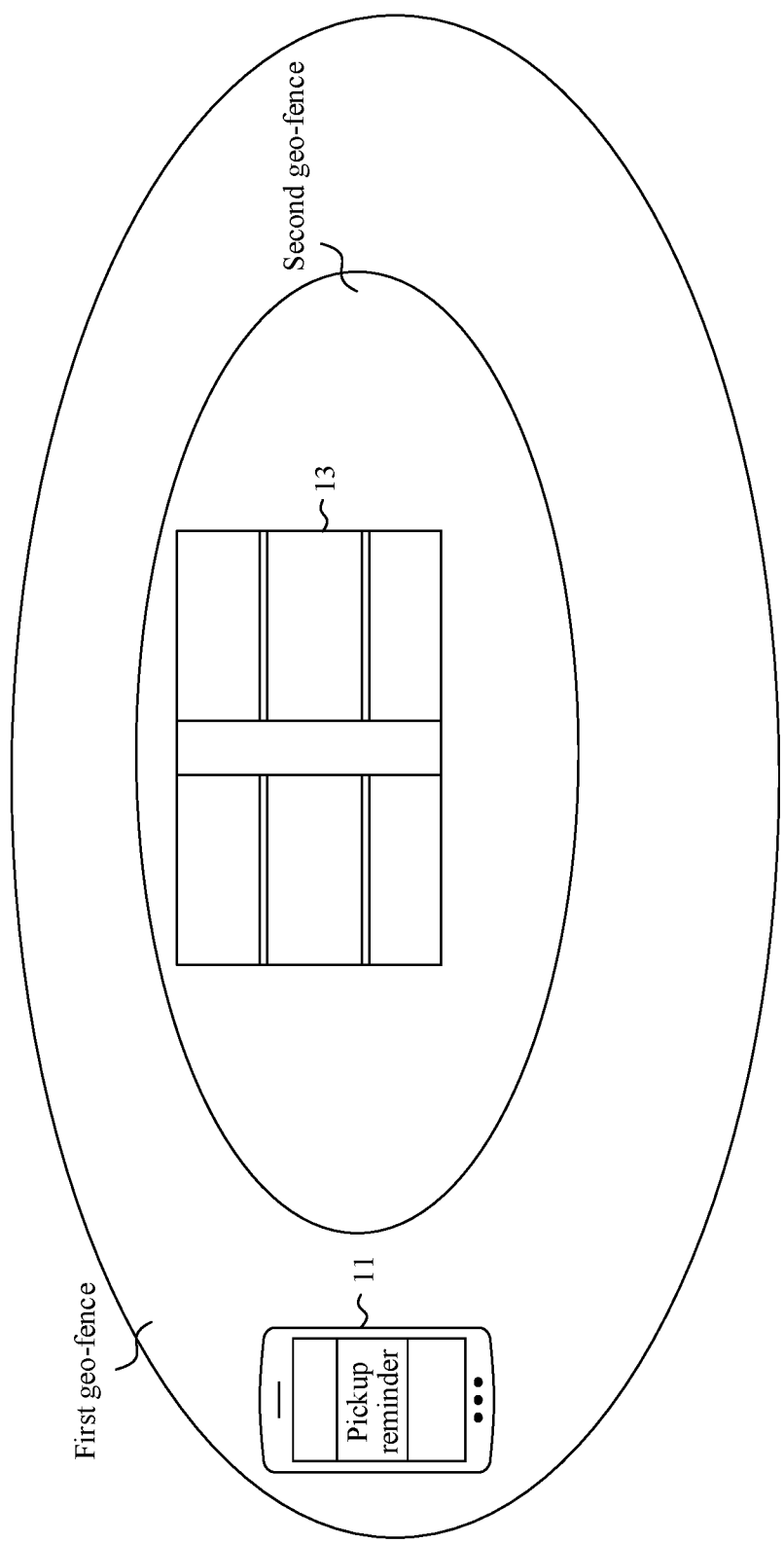
FIG. 2 is a schematic architectural diagram 2 of a delivery message system according to an embodiment.

In this way, after receiving the delivery message of the package A that is sent by the server 12, in addition to displaying the delivery message to the recipient, the electronic device 11 may further set a first geo-fence (Geo-fencing) based on the location information of the locker 13. The first geo-fence may be used to prompt the recipient to pick up the package A. For example, the first geo-fence may be an area in which the location of the locker 13 is used as a center and that is far away from the locker 13 by 100 to 300 meters. Therefore, as shown in FIG. 2, when the electronic device 11 detects that the electronic device 11 is located in the first geo-fence, it indicates that the recipient is relatively close to the locker 13, to be specific, the recipient has a condition for picking up the package A. In this case, the electronic device 11 may display a pickup notification. For example, the pickup notification may include the pickup information of the package A such as the delivery pickup code, and is used to remind the recipient to pick up the package A as soon as possible.

In some embodiments, the electronic device 11 may further set a second geo-fence based on the location information of the locker 13. The second geo-fence may be used to prompt the recipient to automatically open, by using the electronic device 11, the pickup box in which the package A is located. For example, the second geo-fence may be an area in which the location of the locker 13 is used as the center and that is far away from the locker 13 within 20 meters. As shown in FIG. 3(*a*), the second geo-fence may be within the first geo-fence. In this case, there is an overlapping area between the first geo-fence and the second geo-fence, and the locker 13 is located in the overlapping area. Alternatively, as shown in FIG. 3(*b*), there is no overlapping area between the first geo-fence and the second geo-fence. The first geo-fence is an area in an area 301 other than the second geo-fence, and the area 301 includes the second geo-fence. In this case, the locker 13 is located in the second geo-fence.

Figure 4:
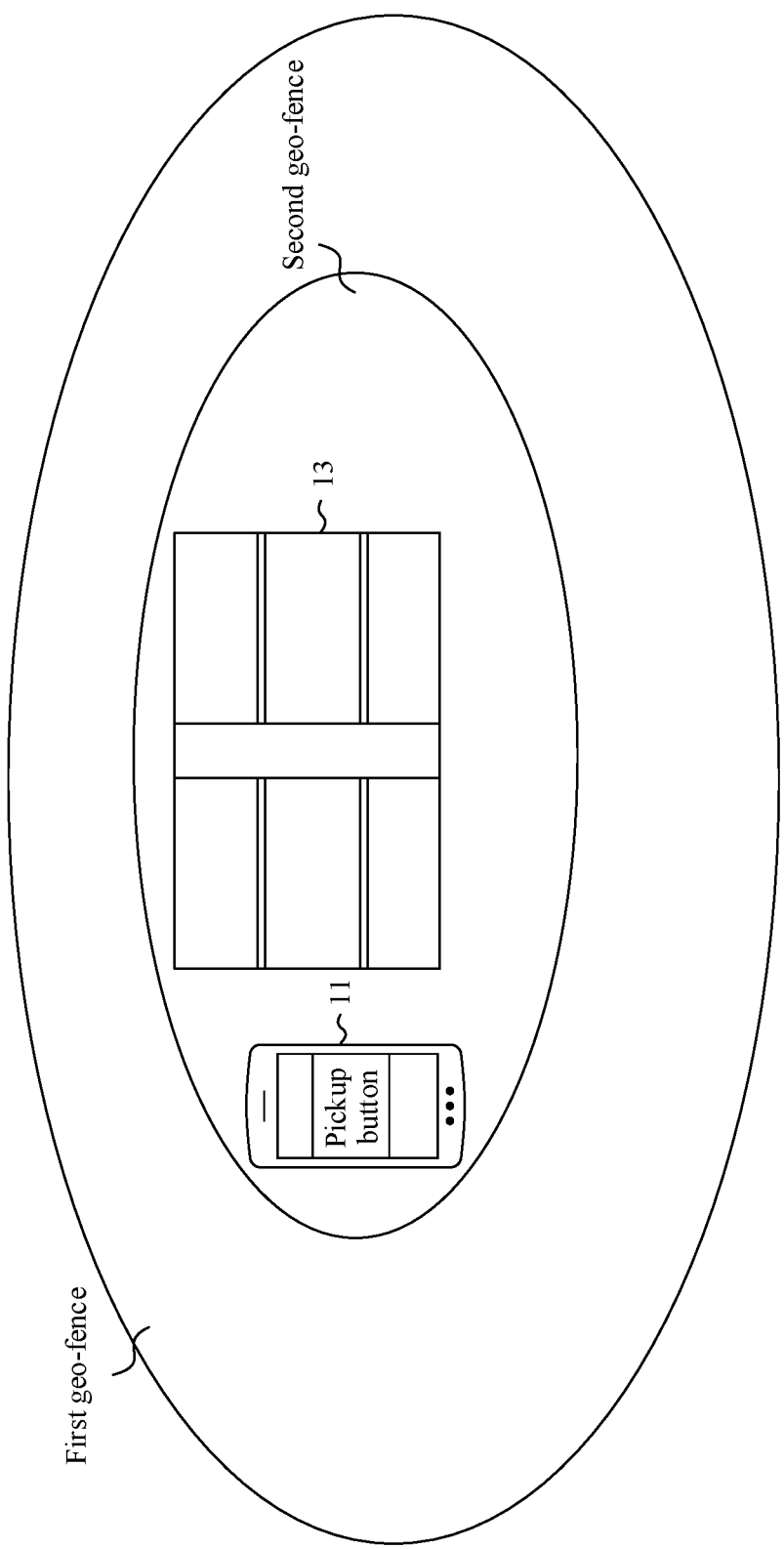
FIG. 4 is a schematic architectural diagram 4 of a delivery message system according to an embodiment.

Therefore, as shown in FIG. 4, when the electronic device 11 detects that the electronic device 11 is located in the second geo-fence, it indicates that the recipient is very close to the locker 13. In this case, it is apparent that the recipient intends to pick up the package from the locker 13. Therefore, the electronic device 11 may display a pickup button used to automatically open the pickup box. If it is detected that a user taps the pickup button, the electronic device 11 may send a pickup request to the server 12. The pickup request may carry the pickup information such as the identifier of the locker and the delivery pickup code. Therefore, the server 12 may send a pickup instruction to the locker 13 in response to the pickup request. After receiving the pickup instruction, the locker 13 may automatically open the pickup box 01 in which the package A is located, to help the recipient pick up the package.

In other words, when it is detected that the electronic device 11 is relatively close to the locker 13 in which a package to be picked up is placed, the electronic device 11 may display a pickup notification, which is used to prompt a recipient to pick up the package, so as to avoid a problem that the recipient cannot pick up the package in time because of forgetting or the like. In addition, when it is detected that the electronic device 11 is very close to the locker 13, it indicates that the user probably intends to pick up the package. In this case, the electronic device 11 may display a pickup button. Therefore, after the user taps the pickup button, the electronic device 11 may request the server 12 to remotely control the locker 13 to automatically open a pick box in which the package to be picked up is located. This simplifies an operation procedure in which the recipient picks up the package from the locker 13.

In addition, in this embodiment of this application, after detecting that the user taps the pickup button, the electronic device 11 may further determine whether the electronic device 11 is currently located in the second geo-fence. If the electronic device 11 is located in the second geo-fence, it indicates that the recipient is relatively close to the locker 13, and there is a relatively low risk that the package is lost after the locker 13 automatically opens the pickup box. In this case, the electronic device 11 may request the server 12 to remotely control the locker 13 to automatically open the pickup box. Correspondingly, if the electronic device 11 is located outside the second geo-fence, it indicates that the recipient is relatively far away from the locker 13. In this case, that the user taps the pickup button may be a misoperation. To avoid a security risk of a package loss, the electronic device 11 does not respond to the current operation that the user taps the pickup button.

An example method for interaction between the electronic device 11, the server 12, and the locker 13 is described in detail in the following embodiments. Therefore, details are not described herein.

For example, the electronic device 11 in the delivery message system may be specifically a mobile phone, a tablet computer, a desktop computer, a laptop, a notebook computer, an ultra-mobile personal computer (UMPC), a handheld computer, a netbook, a personal digital assistant (PDA), a wearable electronic device, or a virtual reality device. A specific form of the electronic device is not particularly limited in the following embodiments.

Figure 5:
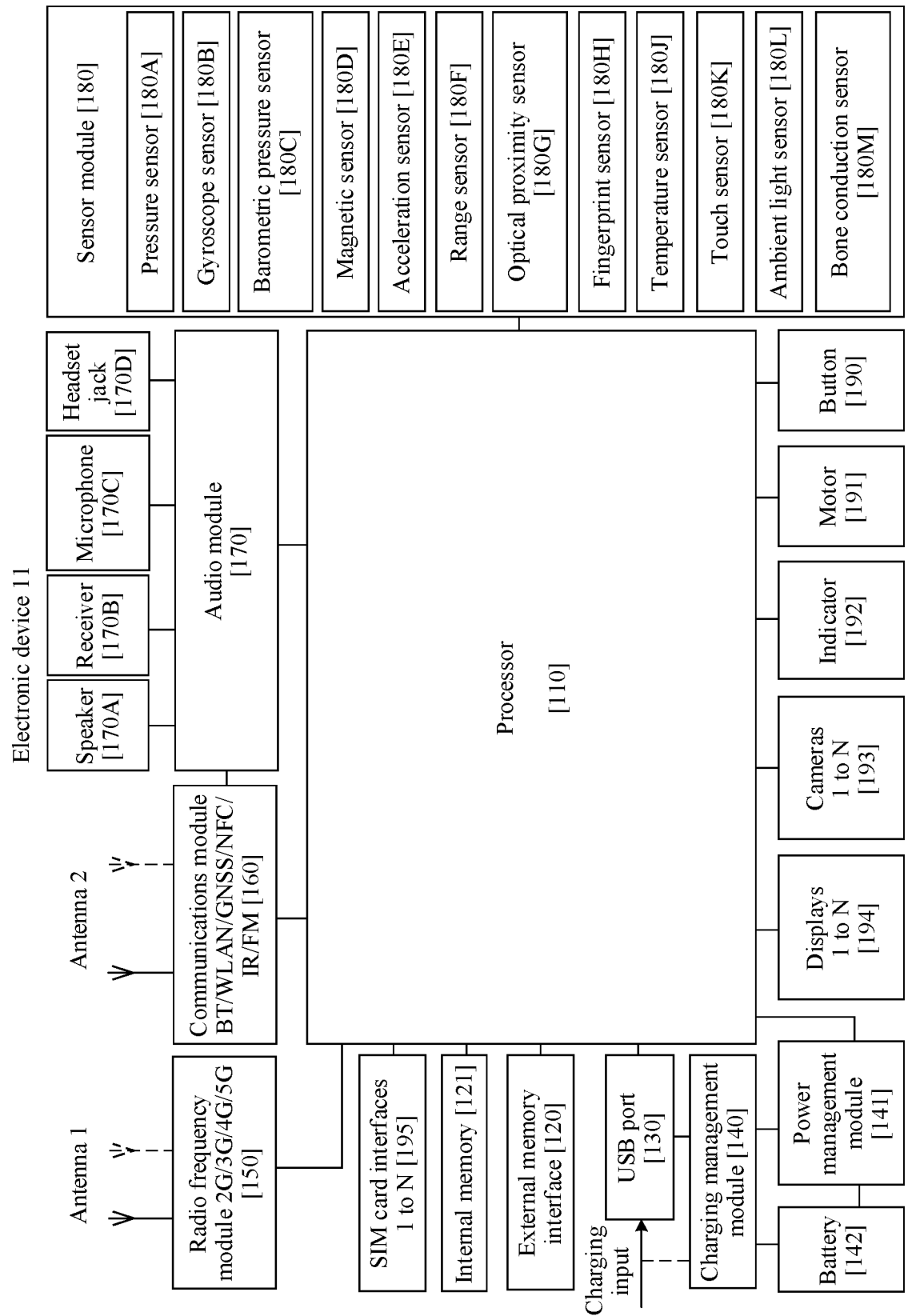
FIG. 5 is a schematic structural diagram 1 of an electronic device according to an embodiment.

FIG. 5 is a schematic structural diagram of the electronic device 11.

The electronic device 11 may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the illustrated structure in this embodiment of the present invention does not constitute a specific limitation on the electronic device 11. In some other embodiments of this application, the electronic device 11 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural processing unit (NPU). Different processing units may be independent devices, or may be integrated into one or more processors.

The controller may be a nerve center and a command center of the electronic device 11. The controller may generate an operation control signal based on instruction operation code and a time sequence signal, to complete control of instruction reading and instruction execution.

A memory may be further disposed in the processor 110, and is configured to store an instruction and data. In some embodiments, the memory in the processor 110 is a cache memory. The memory may store an instruction or data that is just used or cyclically used by the processor 110. If the processor 110 needs to use the instruction or the data again, the processor 110 may directly invoke the instruction or the data from the memory, to avoid repeated access and reduce a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The I2C interface is a two-way synchronization serial bus, and includes one serial data line (serial data line, SDA) and one serial clock line (derail clock line, SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 11.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be configured to: perform audio communication; and sample, quantize, and encode an analog signal. In some embodiments, the audio module 170 may be coupled to the wireless communications module 160 through the PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect to the processor 110 and the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through a Bluetooth headset.

The MIPI interface may be configured to connect to the processor 110 and a peripheral device such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 11. The processor 110 communicates with the display 194 through the DSI interface, to implement a display function of the electronic device 11.

The GPIO interface may be configured by using software. The GPIO interface may be configured as a control signal or a data signal. In some embodiments, the GPIO interface may be configured to connect to the processor 110, the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB port 130 is an interface that conforms to USB standard specifications, and may be specifically a mini USB port, a micro USB port, a USB type C port, or the like. The USB port 130 may be configured to connect to the charger to charge the electronic device 11, or may be configured to transmit data between the electronic device 11 and a peripheral device, or may be configured to connect to a headset to play audio through the headset, or may be configured to connect to another electronic device such as an AR device.

It can be understood that an interface connection relationship between the modules shown in this embodiment of the present invention is merely an example for description, and does not constitute a limitation on the structure of the electronic device 11. In some other embodiments of this application, the electronic device 11 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB port 130. In some embodiments of wireless charging, the charging management module 140 may receive a wireless charging input through a wireless charging coil of the electronic device 11. When charging the battery 142, the charging management module 140 may further charge the electronic device through the power management module 141.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 11 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 11 may be configured to cover one or more communication bands. Different antennas may be further multiplexed, to increase antenna utilization. For example, the antenna 1 may be multiplexed as a diversity antenna in a wireless local area network. In some other embodiments, an antenna may be used in combination with a tuning switch.

The mobile communications module 150 may provide a solution, applied to the electronic device 11, to wireless communication including 2G, 3G, 4G, 5G, or the like. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal to an electromagnetic wave through the antenna 1 for radiation. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communications module 150 or another function module.

The wireless communications module 160 may provide a solution, applied to the electronic device 11, to wireless communication including a wireless local area network (WLAN) (for example, a wireless fidelity (Wi-Fi) network), Bluetooth (bluetooth, BT), a global navigational satellite system (GNSS), frequency modulation (FM), near field communication (NFC), an infrared (IR) technology, or the like. The wireless communications module 160 may be one or more devices integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, in the electronic device 11, the antenna 1 is coupled to the mobile communications module 150, and the antenna 2 is coupled to the wireless communications module 160. Therefore, the electronic device 11 can communicate with a network and another device by using a wireless communications technology. The wireless communications technology may include a global system for mobile communications (GSM), a general packet radio service (GPRS), code division multiple access (CDMA), wideband code division multiple access (WCDMA), time division-code division multiple access (TD-SCDMA), long term evolution (long term evolution, LTE), BT, the GNSS, the WLAN, the NFC, the FM, the IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

The electronic device 11 implements the display function through the GPU, the display 194, the application processor, and the like. The GPU is a microprocessor for image processing, and is connected to the display 194 and the application processor. The GPU is configured to: perform mathematical and geometric calculation, and perform graphics rendering. The processor 110 may include one or more GPUs, which execute a program instruction to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), Miniled, MicroLed, Micro-oLed, a quantum dot light emitting diode (QLED), or the like. In some embodiments, the electronic device 11 may include one or N displays 194, where N is a positive integer greater than 1.

The electronic device 11 may implement the photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. The photosensitive element of the camera converts an optical signal into an electrical signal, and transmits the electrical signal to the ISP for processing. The ISP converts the electrical signal into an image that is visible to the eye. The ISP may further perform algorithm optimization on noise, luminance, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) photoelectric transistor. The photosensitive element converts an optical signal into an electrical signal, and then transmits the electrical signal to the ISP. The ISP converts the electrical signal into a digital image signal, and outputs the digital image signal to the DSP for processing. The DSP converts the digital image signal into a standard image signal in a format such as RGB or YUV. In some embodiments, the electronic device 11 may include one or N cameras 193, where N is a positive integer greater than 1.

The digital signal processor is configured to process a digital signal. In addition to the digital image signal, the digital signal processor may further process another digital signal. For example, when the electronic device 11 selects a frequency, the digital signal processor is configured to perform Fourier transform on frequency energy.

The video codec is configured to compress or decompress a digital video. The electronic device 11 may support one or more video codecs. Therefore, the electronic device 11 may play or record videos in a plurality of encoding formats, for example, moving picture experts group (MPEG)1, MPEG2, MPEG3, and MPEG4.

The NPU is a neural-network (NN) computing processor. The NPU quickly processes input information by referring to a biological neural network structure, for example, by referring to a mode of transfer between human brain neurons, and may further continuously perform self-learning. Intelligent cognition of the electronic device 11 such as image recognition, facial recognition, speech recognition, and text understanding can be implemented through the NPU.

The external memory interface 120 may be configured to connect to an external memory card such as a micro SD card, to extend a storage capability of the electronic device 11. The external memory card communicates with the processor 110 through the external memory interface 120, to implement a data storage function, for example, to store files such as music and a video in the external memory card.

The internal memory 121 may be configured to store computer-executable program code. The executable program code includes an instruction. The processor 110 runs the instruction stored in the internal memory 121, to implement various function applications and data processing of the electronic device 11. The internal memory 121 may include a program storage area and a data storage area. The program storage area may store an operating system, an application required by at least one function (for example, a sound play function and an image play function), and the like. The data storage area may store data (such as audio data and a phone book) created when the electronic device 11 is used, and the like. In addition, the internal memory 121 may include a high-speed random access memory, or may include a nonvolatile memory, for example, at least one magnetic disk storage device, a flash memory device, or a universal flash storage (universal flash storage, UFS).

The electronic device 11 may implement audio functions such as music play and recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to perform audio signal encoding and decoding. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The electronic device 11 may listen to music or answer a hands-free call through the speaker 170A.

The receiver 170B, also referred to as an "earpiece", is configured to convert an audio electrical signal into a sound signal. When the electronic device 11 answers a call or receives a voice message, the receiver 170B may be put close to a human ear to listen to the voice message.

The microphone 170 C, also referred to as a "mike" or a "microphone", is configured to convert a sound signal into an electrical signal. When making a call or sending a voice message, a user may make a sound near the microphone 170C through the mouth of the user, to enter a sound signal to the microphone 170C. At least one microphone 170C may be disposed in the electronic device 11. In some other embodiments, two microphones 170C may be disposed in the electronic device 11, to collect a sound signal and further implement a noise reduction function. In some other embodiments, three, four, or more microphones 170C may alternatively be disposed in the electronic device 11, to collect a sound signal, reduce noise, identify a sound source, implement a directional recording function, and the like.

The headset jack 170D is configured to connect to a wired headset. The headset jack 170D may be the USB port 130, or may be a 3.5 mm open mobile electronic device platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed in the display 194. There are many types of pressure sensors 180A, for example, a resistive pressure sensor, an inductive pressure sensor, and a capacitive pressure sensor. The capacitive pressure sensor may include at least two parallel plates made of conductive materials. When force is applied to the pressure sensor 180A, a capacitance between electrodes changes. The electronic device 11 determines a pressure strength based on a capacitance change. When a touch operation is performed on the display 194, the electronic device 11 detects a strength of the touch operation based on the pressure sensor 180A. The electronic device 11 may also calculate a touch position based on a detection signal of the pressure sensor 180A. In some embodiments, touch operations that are performed on a same touch position but have different touch operation strengths may correspond to different operation instructions. For example, when a touch operation whose touch operation strength is less than a first pressure threshold is performed on an icon of Messages, an instruction for viewing an SMS message is executed; or when a touch operation whose touch operation strength is greater than or equal to a first pressure threshold is performed on an icon of Messages, an instruction for creating a new SMS message is executed.

The gyroscope sensor 180B may be configured to determine a motion posture of the electronic device 11. In some embodiments, an angular velocity of the electronic device 11 around three axes (that is, axes x, y, and z) may be determined through the gyroscope sensor 180B. The gyroscope sensor 180B may be used for image stabilization during photographing. For example, when the shutter is pressed, the gyroscope sensor 180B detects an angle at which the electronic device 11 jitters, calculates, based on the angle, a distance for which a lens module needs to compensate, and allows the lens to eliminate the jitter of the electronic device 11 through a reverse motion, to implement image stabilization. The gyroscope sensor 180B may be further used in a navigation scenario and a somatic game scenario.

The barometric pressure sensor 180C is configured to measure atmospheric pressure. In some embodiments, the electronic device 11 calculates an altitude based on a barometric pressure value obtained by the barometric pressure sensor 180C through measurement, to assist in positioning and navigation.

The magnetic sensor 180D includes a Hall sensor. The electronic device 11 may detect opening and closing of a flip cover by using the magnetic sensor 180D. In some embodiments, when the electronic device 11 is a clamshell phone, the electronic device 11 may detect opening and closing of a flip cover based on the magnetic sensor 180D, to set a feature such as automatic unlocking through flipping based on a detected opening or closing state of the flip cover or a detected opening or closing state of the flip cover.

The acceleration sensor 180E may detect acceleration values in various directions (usually on three axes) of the electronic device 11, and may detect a gravity value and a gravity direction when the electronic device 11 is still. The acceleration sensor 180E may be further configured to identify a posture of the electronic device, and is applied to applications such as a pedometer and switching between a landscape mode and a portrait mode.

The range sensor 180F is configured to measure a distance. The electronic device 11 may measure a distance in an infrared or a laser manner. In some embodiments, in a photographing scenario, the electronic device 11 may measure a distance by using the range sensor 180F, to implement quick focusing.

The optical proximity sensor 180G may include, for example, a light-emitting diode (LED) and an optical detector such as a photodiode. The light-emitting diode may be an infrared light-emitting diode. The electronic device 11 emits infrared light through the light-emitting diode. The electronic device 11 detects infrared reflected light from a nearby object through the photodiode. When sufficient reflected light is detected, it may be determined that there is an object near the electronic device 11. When insufficient reflected light is detected, it may be determined that there is no object near the electronic device 11. The electronic device 11 may detect, by using the optical proximity sensor 180G, that the user holds the electronic device 11 close to the ear for a call, to automatically turn off a screen for power saving. The optical proximity sensor 180G may also be used in a smart cover mode or a pocket mode to automatically unlock or lock the screen.

The ambient light sensor 180L is configured to sense ambient light luminance. The electronic device 11 may adaptively adjust luminance of the display 194 based on the sensed ambient light luminance. The ambient light sensor 180L may also be configured to automatically adjust a white balance during photographing. The ambient light sensor 180L may further cooperate with the optical proximity sensor 180G to detect whether the electronic device 11 is in a pocket, to prevent an accidental touch.

The fingerprint sensor 180H is configured to collect a fingerprint. The electronic device 11 may implement fingerprint-based unlocking, application lock access, fingerprint-based photographing, fingerprint-based call answering, and the like by using a feature of the collected fingerprint.

The temperature sensor 180J is configured to detect a temperature. In some embodiments, the electronic device 11 executes a temperature processing policy by using the temperature detected by the temperature sensor 180J. For example, when the temperature reported by the temperature sensor 180J exceeds a threshold, the electronic device 11 degrades performance of a processor located near the temperature sensor 180J, to reduce power consumption for thermal protection. In some other embodiments, when the temperature is less than another threshold, the electronic device 11 heats the battery 142 to prevent the electronic device 11 from being shut down abnormally because of a low temperature. In some other embodiments, when the temperature is less than still another threshold, the electronic device 11 boosts an output voltage of the battery 142, to prevent abnormal shutdown caused by a low temperature.

The touch sensor 180K is also referred to as a "touch panel". The touch sensor 180K may be disposed in the display 194. The touch sensor 180K and the display 194 constitute a touchscreen that is also referred to as a "touchscreen". The touch sensor 180K is configured to detect a touch operation performed on or near the touchscreen. The touch sensor may transfer the detected touch operation to the application processor, to determine a type of a touch event, and provide a corresponding visual output related to the touch operation through the display 194. In some other embodiments, the touch sensor 180K may also be disposed on a surface of the electronic device 11 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a body pulse to receive a blood pressure beating signal. In some embodiments, the bone conduction sensor 180M may alternatively be disposed in a headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 11 may receive a button input, and generate a button signal input related to a user setting and function control of the electronic device 11.

The motor 191 may generate a vibration prompt. The motor 191 may be used for an incoming call vibration prompt, or may be used for a touch vibration feedback. For example, touch operations performed on different applications (for example, photographing and audio play) may correspond to different vibration feedback effects. Touch operations performed on different areas on the display 194 may also correspond to different vibration feedback effects. Different application scenarios (for example, a time reminder scenario, an information receiving scenario, an alarm clock scenario, and a game scenario) may also correspond to different vibration feedback effects. A touch vibration feedback effect may alternatively be customized.

The indicator 192 may be an indicator light, which may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 11. The electronic device 11 may support one or N SIM card interfaces, where N is a positive integer greater than 1. The SIM card interface 195 may support a nano SIM card, a micro SIM card, a SIM card, and the like. A plurality of cards may be simultaneously inserted into one SIM card interface 195. The plurality of cards may be of a same type or different types. The SIM card interface 195 may also be compatible with different types of SIM cards. The SIM card interface 195 may also be compatible with an external memory card. The electronic device 11 interacts with a network by using the SIM card, to implement functions such as calling and data communication. In some embodiments, the electronic device 11 uses an eSIM, that is, an embedded SIM card. The eSIM card may be embedded in the electronic device 11, and cannot be separated from the electronic device 11.

In the following embodiments, an example in which a mobile phone is used as the electronic device 11 is used to describe a method for controlling a locker based on a delivery message provided in an embodiment of this application.

In this embodiment of this application, an APP having a delivery reminder service may be installed in the mobile phone, or a delivery reminder service may be preset in an operating system of the mobile phone, to be specific, the delivery reminder service may be set in the mobile phone as a system-level service before the mobile phone is delivered from the factory.

Figure 6:
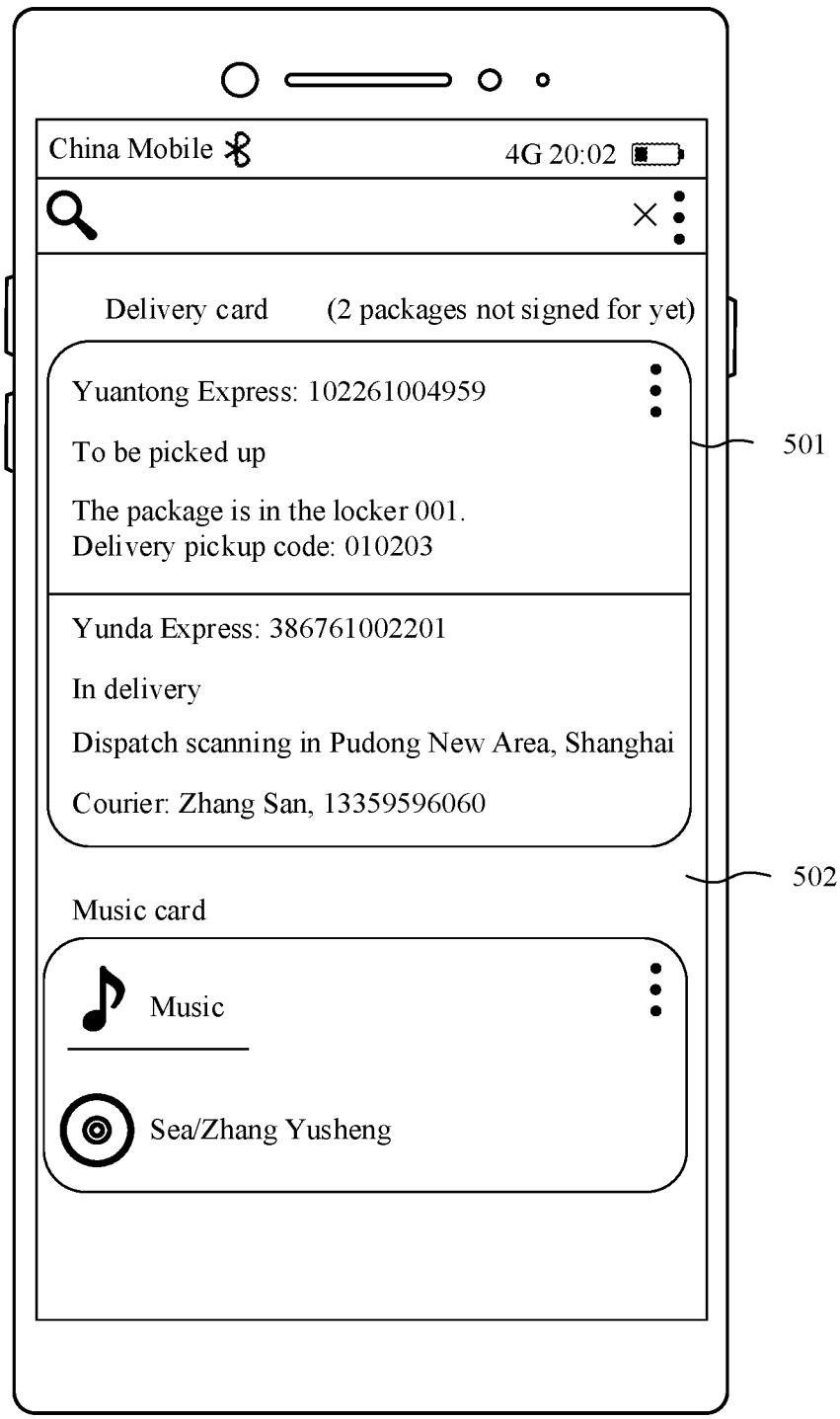
FIG. 6 is a schematic diagram 1 of a scenario of registering a delivery reminder service according to an embodiment.

For example, a function of a delivery card or a delivery assistant may be preset in the mobile phone. As shown in FIG. 6, a delivery card 501 is used as an example. The mobile phone may display the delivery card 501 in a left-most screen 502 of the mobile phone (the left-most screen is a screen that is on the left of a plurality of desktop screens of the system and that is used to display information. The desktop screen is used to place an application or a widget icon). After a user registers a delivery reminder service in the delivery card 501, the mobile phone may display one or more pieces of delivery information of the registered user in the delivery card 501. For example, the delivery card 501 may include a delivery tracking number, logistics information, and pickup information. Certainly, the delivery card 501 may alternatively be displayed in a pull-up menu, a drop-down menu, a desktop, or a lock screen of the mobile phone. This is not limited in this embodiment of this application.

Figure 7:
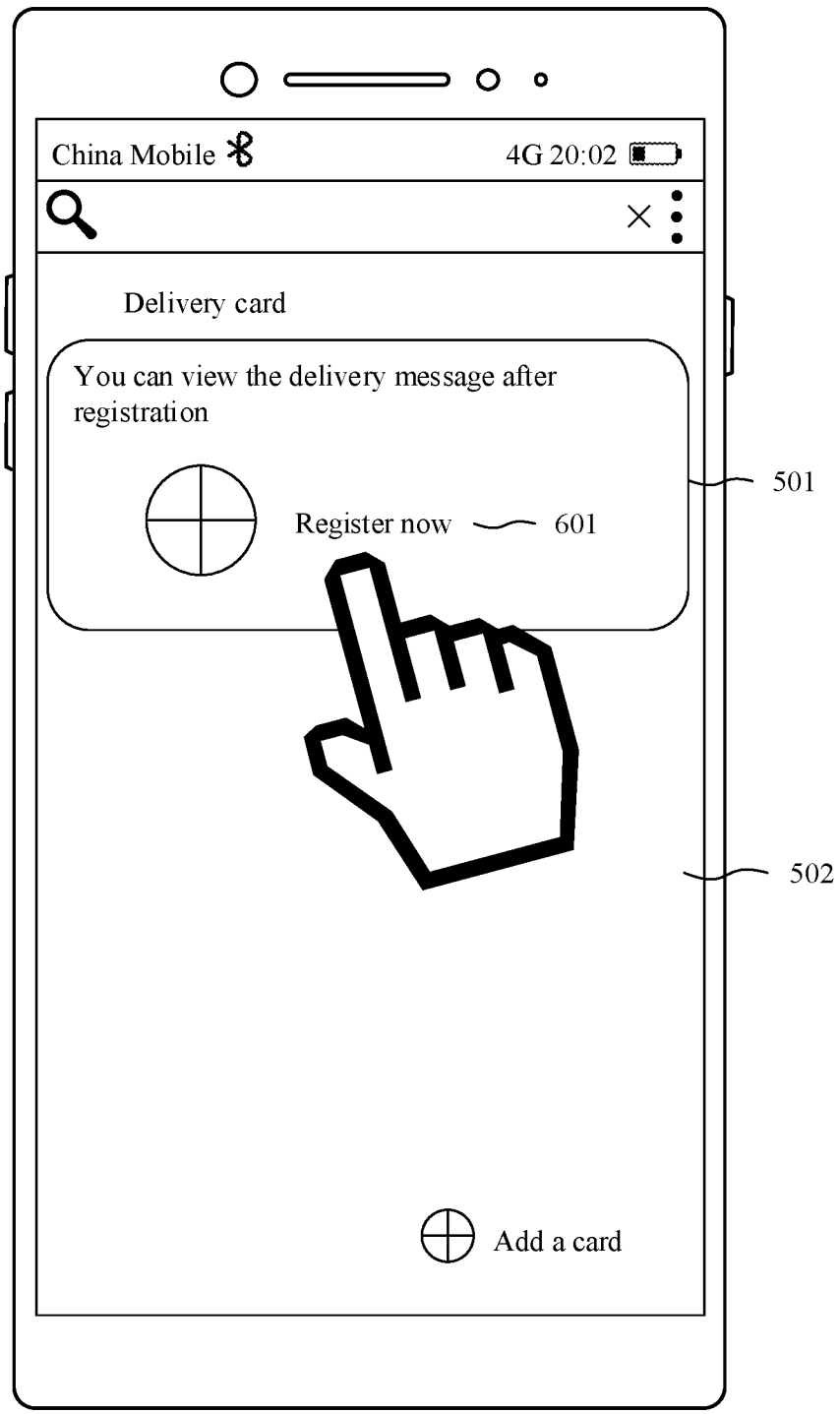
FIG. 7 is a schematic diagram 2 of a scenario of registering a delivery reminder service according to an embodiment.
Figure 8:
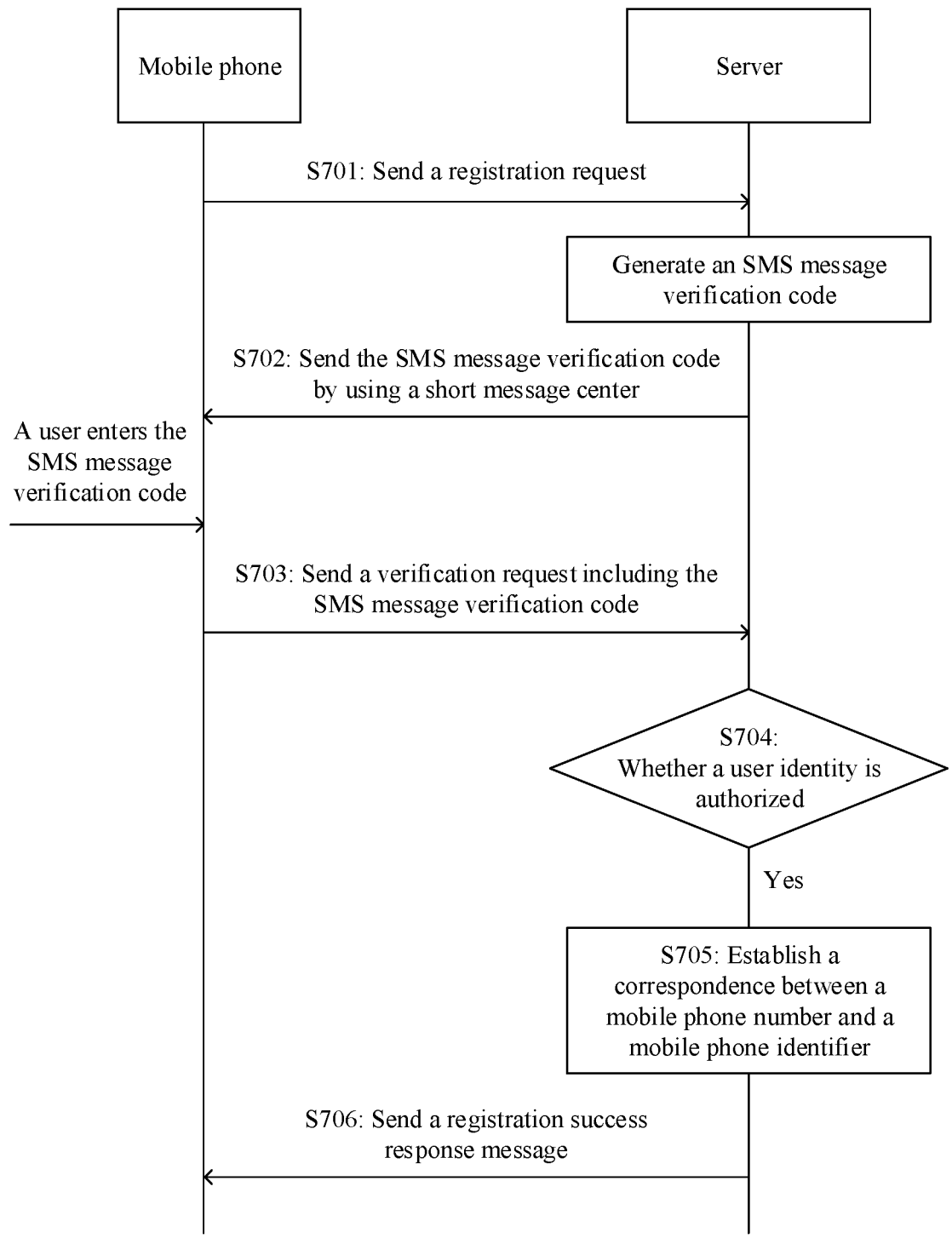
FIG. 8 is a schematic interaction diagram of registering a delivery reminder service according to an embodiment.

Before using the delivery reminder service provided by the delivery card 501, the user needs to first register the delivery reminder service with a server by using the mobile phone, to become the registered user of the delivery reminder service. For example, as shown in FIG. 7, when the user uses the delivery card 501 for the first time, the mobile phone may display a registration button 601 in the delivery card 501, to prompt the user to register the delivery reminder service. If the mobile phone detects that the user taps the registration button 601, as shown in FIG. 8, the mobile phone may register the delivery reminder service associated with the user with the server by performing steps S701 to S706.

S701: The mobile phone sends a registration request for the delivery reminder service to the server.

Figure 9:
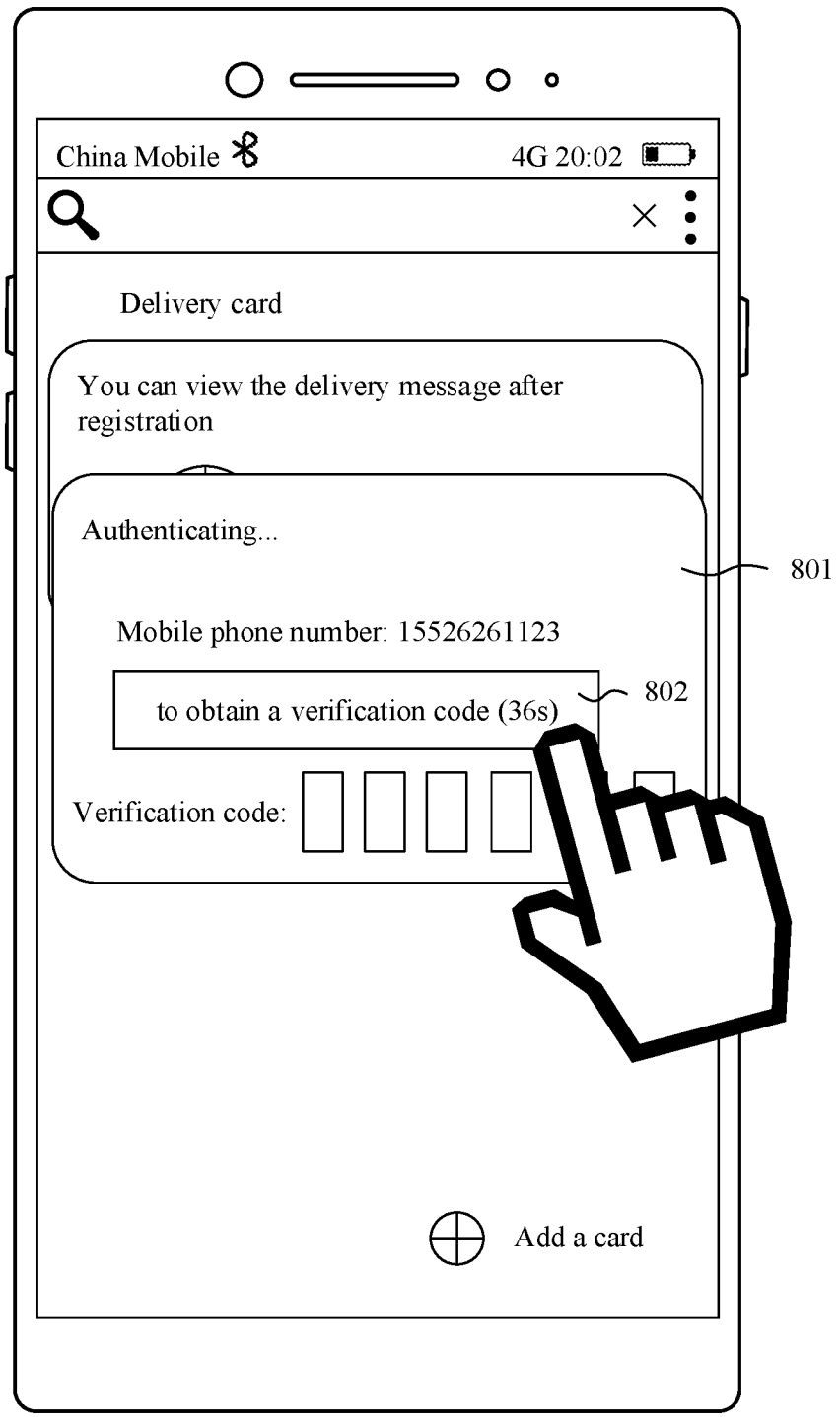
FIG. 9 is a schematic diagram 3 of a scenario of registering a delivery reminder service according to an embodiment.

For example, after the mobile phone detects that the user taps the registration button 601, as shown in FIG. 9, the mobile phone may display a dialog box 801 for registering the delivery reminder service. In addition, the user needs to enter, in the dialog box 801, a mobile phone number of a recipient that is bound to the delivery reminder service. The mobile phone number may be a mobile phone number of the mobile phone of the user or a mobile phone number of another user. The mobile phone number entered by the user in the dialog box 801 may be used as a basis for subsequently pushing a related delivery message to a mobile phone by the server, to be specific, a mobile phone number of a recipient in the delivery message subsequently pushed by the server to the mobile phone is the same as the mobile phone number entered by the user in the dialog box 801.

After entering the mobile phone number of the recipient in the dialog box 801, the user may tap a button 802 for obtaining an SMS message verification code. In response to the operation that the user taps the button 802, the mobile phone may send the registration request for the delivery reminder service to the server. The registration request carries a mobile phone identifier and the mobile phone number (that is, the mobile phone number of the recipient) entered by the user in the dialog box 801. The mobile phone identifier may be an ID that can uniquely identify the mobile phone, such as an IMEI (International Mobile Equipment Identity), an SN (Serial Number), or a MAC address.

S702: In response to the registration request, the server generates an SMS message verification code, and sends the SMS message verification code to the mobile phone by using a short message center.

After receiving the registration request sent by the mobile phone, the server may generate the SMS message verification code including a digit and/or a letter, and send the SMS message verification code and the mobile phone number that is carried in the registration request to the short message center (SMC). After receiving the SMS message verification code and the mobile phone number, the short message center may send, by using a gateway, the SMS message verification code generated by the server to a corresponding mobile phone based on the mobile phone number.

S703: The mobile phone sends a verification request including the SMS message verification code to the server in response to the SMS message verification code entered by the user.

Figure 10:
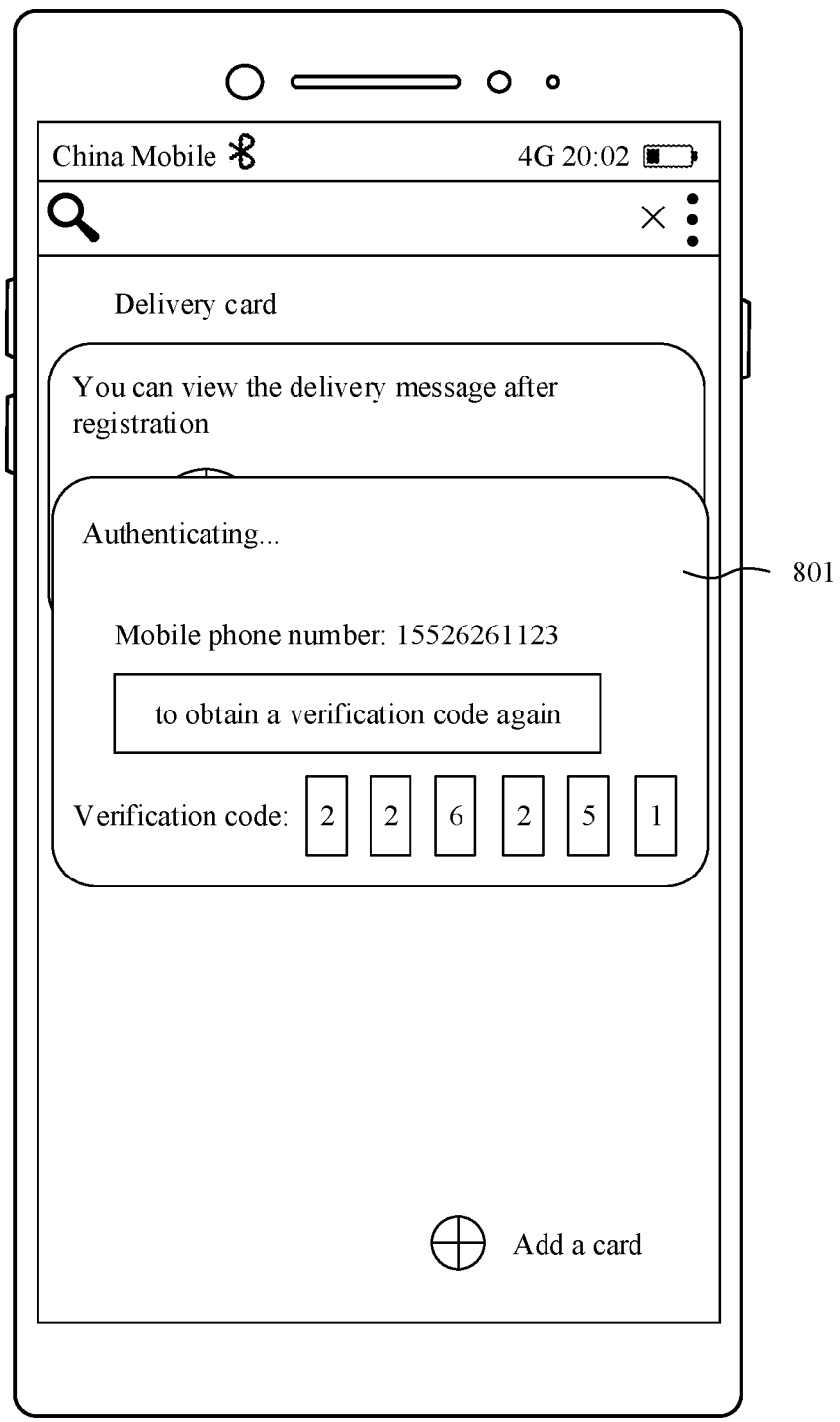
FIG. 10 is a schematic diagram 4 of a scenario of registering a delivery reminder service according to an embodiment.

After the mobile phone receives the SMS message verification code in a form of an SMS message, as shown in FIG. 10, the user may continue to enter the SMS message verification code in the SMS message in the dialog box 801. After the mobile phone detects that the user enters the SMS message verification code, the mobile phone may add the SMS message verification code entered by the user in the dialog box 801 to the verification request, and send the verification request to the server, so that the server performs verification on an identity of the user who registers the delivery reminder service.

S704: The server performs authentication on the user identity based on the SMS message verification code in the verification request in response to the verification request.

After receiving the verification request sent by the mobile phone, the server may compare the SMS message verification code carried in the verification request with the SMS message verification code generated by the server in step S702. If the two SMS message verification codes are consistent, it may indicate that the SMS message verification code entered by the user is correct, and the server may consider that the identity of the user who currently registers the delivery reminder service is authorized. Otherwise, it may be considered that the identity of the user who currently registers the delivery reminder service is unauthorized.

Alternatively, in addition to comparing the SMS message verification code carried in the verification request with the SMS message verification code generated by the server in step S702, the server may further determine whether a receiving time at which the verification request is received exceeds a preset time limit. For example, the server may preset that a verification request received within five minutes after the SMS message verification code is sent is authorized. In this case, if the receiving time at which the verification request is received exceeds the time limit of five minutes that is set by the server, regardless of whether the SMS message verification code carried in the verification request is consistent with the SMS message verification code generated by the server in step S702, the server may consider that the identity of the user who currently registers the delivery reminder service is unauthorized. Correspondingly, if the SMS message verification code carried in the verification request is consistent with the SMS message verification code generated by the server in step S702, and the receiving time at which the verification request is received is within the time limit of five minutes, the server may consider that the identity of the user who currently registers the delivery reminder service is authorized.

S705: The server establishes a correspondence between the mobile phone number and the mobile phone identifier if the authentication performed on the user identity succeeds.

By performing step S704, if the server determines that the identity of the user who currently registers the delivery reminder service is authorized, it indicates that the authentication performed on the user identity succeeds. To subsequently provide the delivery reminder service for an authorized registered user, the server may store the correspondence between the mobile phone identifier and the mobile phone number of the recipient that are obtained in step S701. Certainly, when each user uses a delivery card or an APP, the user may register a delivery reminder service in a mobile phone according to the foregoing method. Therefore, the server stores correspondences between a plurality of mobile phone identifiers and mobile phone numbers of a plurality of recipients.

Subsequently, if the server obtains a delivery message of a specific package to be picked up in a locker, the server may determine, based on the foregoing correspondence, a mobile phone identifier corresponding to a mobile phone number of a recipient in the delivery message, and the server may further send the delivery message to a corresponding mobile phone based on the corresponding mobile phone identifier, to remind a user who registers the delivery reminder service in the mobile phone to pick up the package.

S706: The server sends a registration success response message to the mobile phone.

After establishing the correspondence between the mobile phone number and the mobile phone identifier that are obtained in step S701, the server may further generate authentication information by using a specific algorithm and store the authentication information. The authentication information is used to indicate validity of a mobile phone that currently registers the delivery reminder service. For example, the authentication information may include a digit and/or a letter. Further, the server may add the generated authentication information to the registration success response message, and send the registration success response message to the mobile phone.

After receiving the response message sent by the server, the mobile phone may locally store the authentication information carried in the response message. Subsequently, when the mobile phone interacts with the server, the mobile phone may send the authentication information to the server as a user identity authentication success credential. In this way, the server may perform authentication on the identity of the registered user based on the authentication information without a need of verifying the SMS message verification code.

Figure 11:
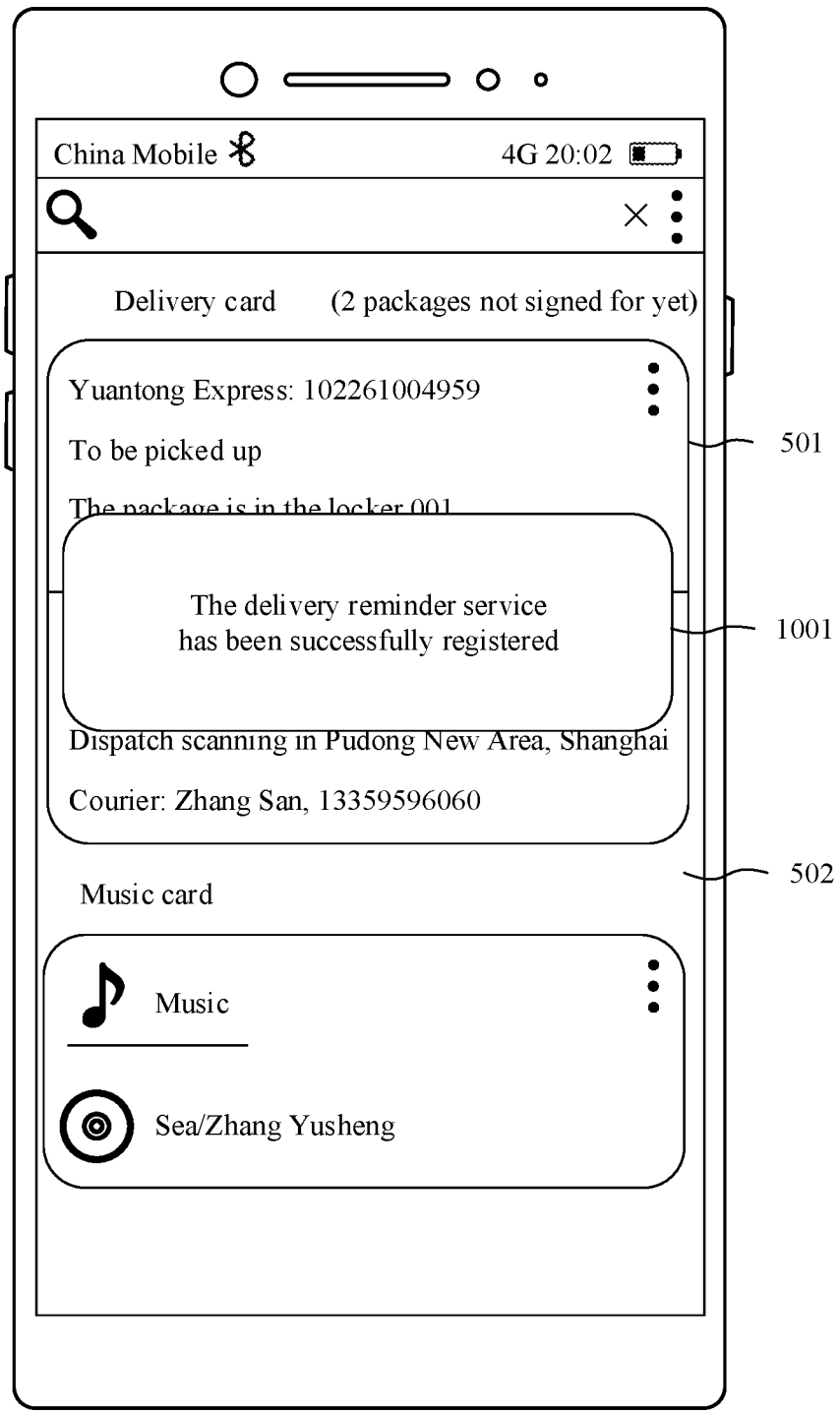
FIG. 11 is a schematic diagram 5 of a scenario of registering a delivery reminder service according to an embodiment.

In addition, as shown in FIG. 11, after receiving the registration success response message sent by the server, the mobile phone may further display a registration success prompt message 1001 in the delivery card 501. In this case, if there is a delivery message associated with the mobile phone number registered by the user, in other words, if a mobile phone number of a recipient in the delivery message is the mobile phone number registered by the user in the foregoing embodiment, the mobile phone may display, in the delivery card 501, the delivery message associated with the mobile phone number, for example, a delivery tracking number, logistics information, and pickup information.

Figure 12:
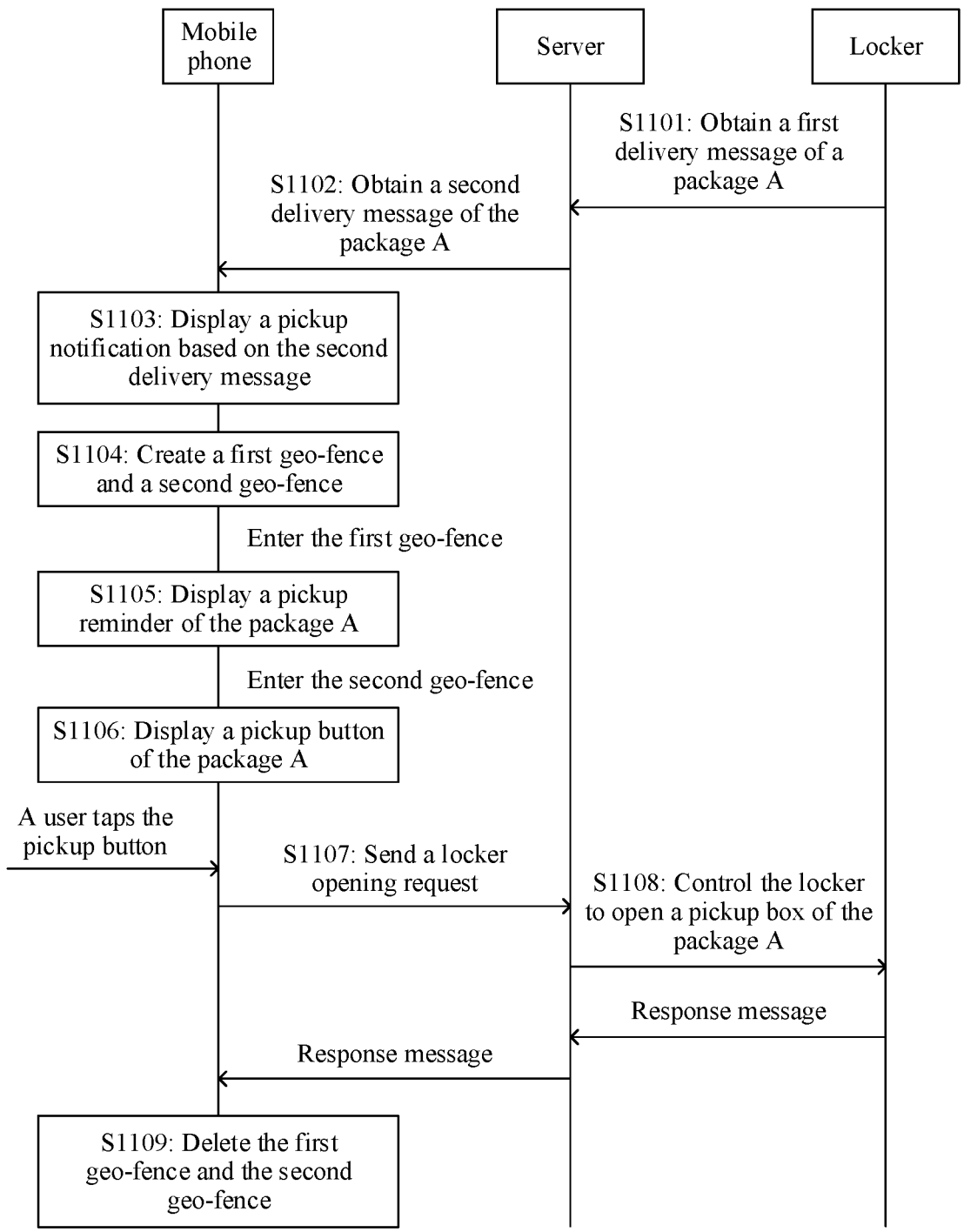
FIG. 12 is a schematic interaction diagram of a method for controlling a locker based on a delivery message according to an embodiment.

Specifically, as shown in FIG. 12, for a method in which the server pushes a delivery message to the mobile phone, refer to steps S1101 to S1109.

S1101: The server obtains a first delivery message of a package A placed in a locker by a courier.

Usually, there are a plurality of lockers that can communicate with the server. When delivering a package, the courier usually places the package in a locker that is relatively close to a delivery address. For example, when the courier delivers the package A, the courier may place the package A in a pickup box 002 in a locker 001 based on a delivery address of the package A. Further, the courier may enter related delivery information of the package A in the locker 001, for example, a mobile phone number of a recipient and a delivery tracking number of the package A. Certainly, the courier may alternatively first enter related delivery information of the package A in the locker 001, and then open the pickup box 002 to place the package A. This is not limited in this embodiment of this application.

In this way, the locker 001 can determine a correspondence between pickup information and recipient information of the package A. The pickup information of the package A includes information used to pick up the package A from the locker 001, for example, an identifier of the locker 001, an identifier of the pickup box 002, and a delivery pickup code. The recipient information of the package A includes the mobile phone number of the recipient. Certainly, the recipient information may further include information used to indicate a recipient identity, such as a recipient name, an ID card number, a delivery address, or a postal code.

Further, the locker 001 may send the pickup information and the recipient information of the package A to the server as the first delivery message, so that the server obtains the first delivery message of the package A placed in the locker 001. Certainly, the first delivery message may further include information such as a logistics order number, logistics information, and contact details of an express-delivery company of the package A.

In addition, in this embodiment of this application, the locker 001 may further add location information of the locker 001 to the first delivery message, and send the first delivery message to the server. For example, if the locker 001 has a positioning function (for example, a GPS function), the locker 001 may add latitude and longitude information of the locker 001 to the first delivery message as the location information. For another example, when installing the locker 001, an installation personnel may alternatively enter the location information of the locker 001 in the locker 001.

It should be noted that, in addition to that the first delivery message is sent by the locker 001 to the server, the first delivery message may also be sent by the courier to the server by using another terminal (for example, a mobile phone). This is not limited in this embodiment of this application.

S1102: The server sends a second delivery message of the package A to a corresponding mobile phone based on the mobile phone number of the recipient in the first delivery message.

After receiving the first delivery message of the package A, the server may first determine, based on the mobile phone number of the recipient in the first delivery message, whether the recipient is a registered user who has registered the delivery reminder service. If the server stores a correspondence between the mobile phone number of the recipient in the first delivery message and a specific mobile phone identifier, it indicates that the recipient of the package A is a registered user, and the server may further determine, based on the correspondence, a specific mobile phone that is bound to the mobile phone number.

In addition, in this embodiment, the server may further determine, based on an identifier of a locker (for example, the locker 001) carried in the first delivery message, the location information of the locker 001 in which the package A is placed. For example, when each locker is installed, the installation personnel or the locker may report location information of the locker to the server. The server stores correspondences between identifiers of different lockers and location information of corresponding lockers. In this way, after receiving the first delivery message of the package A, the server may determine, based on the identifier of the locker in the first delivery message, location information corresponding to the locker, and the server may further add the location information to the first delivery message to constitute the second delivery message.

Alternatively, the recipient usually picks up the package A by using only the pickup information of the package A. Therefore, the server may use the pickup information and the location information of the locker that are carried in the first delivery message as the second delivery message. Certainly, the second delivery message may further include one or more pieces of information such as the recipient name, the logistics order number, the logistics information, and the contact details of the express-delivery company of the package A.

Subsequently, the server may send the second delivery message to the corresponding mobile phone based on the mobile phone identifier corresponding to the mobile phone number of the recipient. Certainly, if the first delivery message received by the server includes the location information of the locker 001, the server does not need to determine the location information of the locker 001, and may send the first delivery message (or the pickup information in the first delivery message) to the corresponding mobile phone as the second delivery message.

S1103: The mobile phone displays a pickup notification based on the second delivery message of the package A.

After the mobile phone receives the second delivery message of the package A that is sent by the server, it indicates that the package A has been placed in the locker by the courier. In this case, the mobile phone may display one pickup notification, to prompt the user to pick up the package A from the corresponding locker. The pickup notification may include the delivery pickup code of the package A.

Figure 13A:
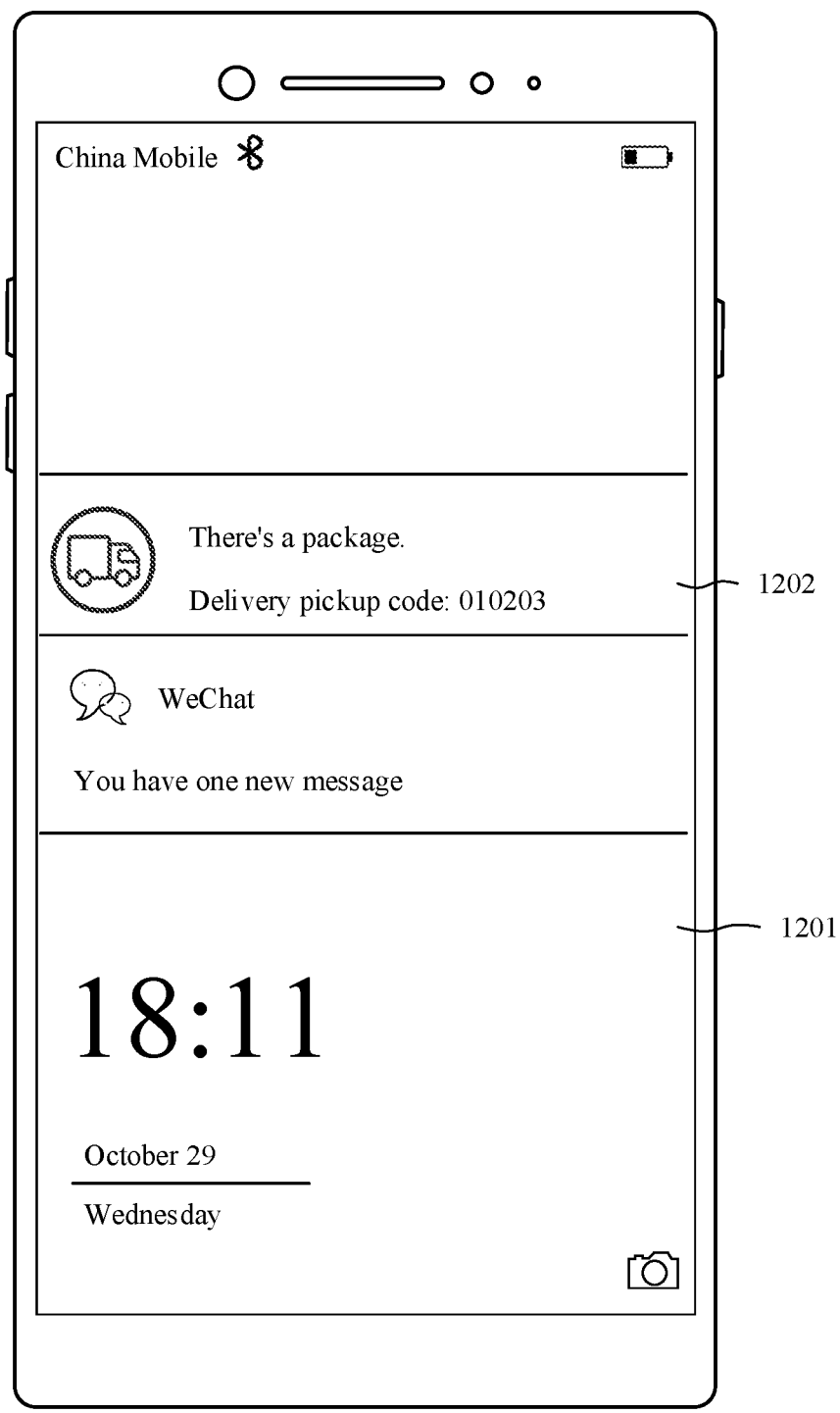
FIG. 13(a), FIG. 13(b), and FIG. 13(c) are a schematic scenario diagram 1 of a method for controlling a locker based on a delivery message according to an embodiment.
Figure 13B:
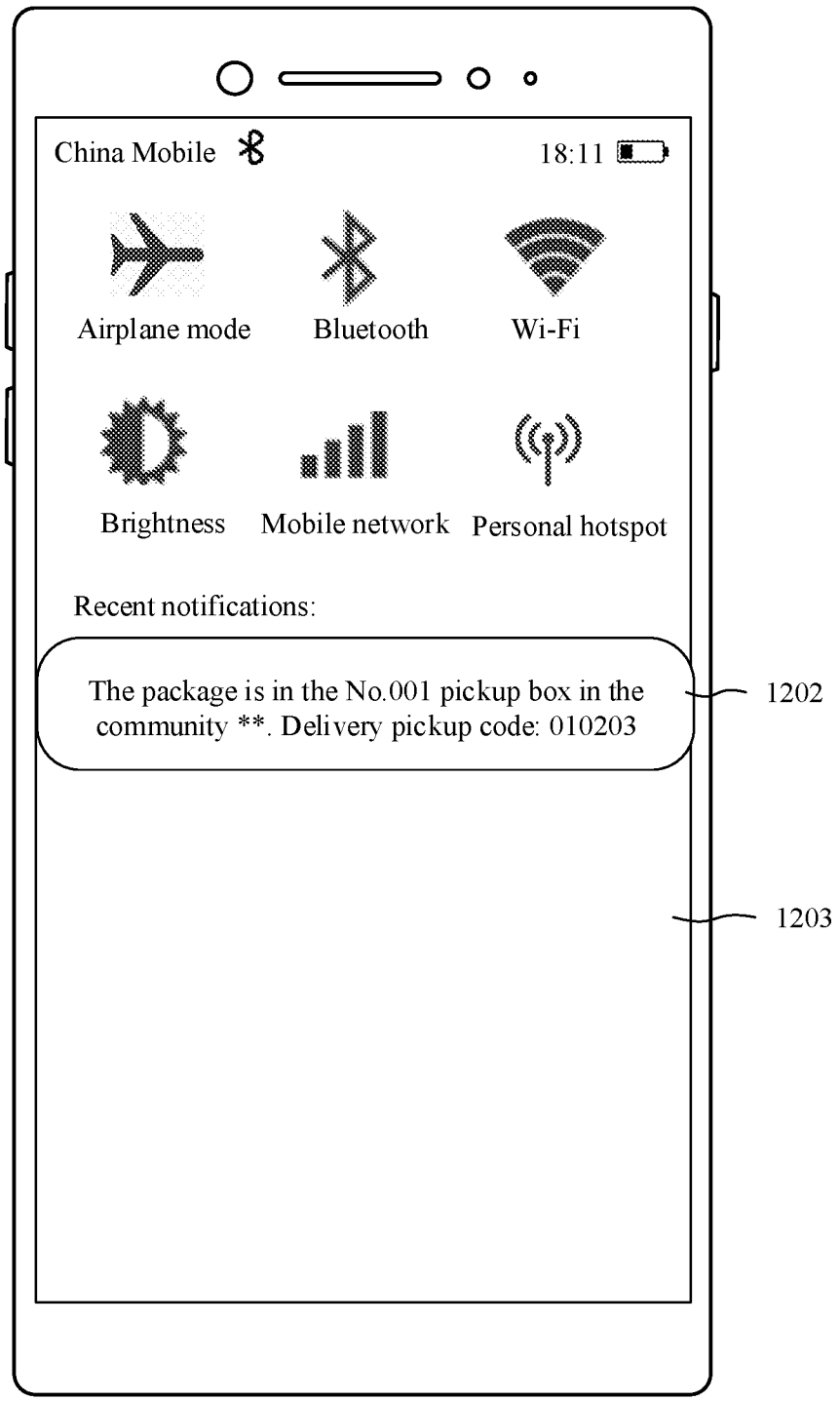
Figure 13C:

For example, as shown in FIG. 13(a), if the mobile phone is in a screen-off state or a screen-locked state when receiving the second delivery message, the mobile phone may display a lock screen 1201 after receiving the second delivery message, and display a pickup notification 1202 on the lock screen 1201. Alternatively, as shown in FIG. 13(b), the mobile phone may display the pickup notification 1202 in a drop-down menu 1203. Alternatively, as shown in FIG. 13(c), the mobile phone may display the pickup notification 1202 in a message notification bar 1204. This is not limited in this embodiment of this application.

If the mobile phone detects that the user enters a preset gesture (for example, a tap gesture, a press gesture, or a slide gesture) in the pickup notification 1202, it indicates that the user expects to further view the delivery message of the package A. In this case, as shown in FIG. 6, the mobile phone may jump to the left-most screen 502 (or a corresponding APP) in which the delivery card 501 is located, and display detailed information about the package A in the delivery card 501, for example, the delivery tracking number, a logistics record, and the pickup information of the package A. In addition, the mobile phone may further mark a latest received delivery message in the delivery card 501 in a manner of highlighting or the like.

S1104: The mobile phone creates a first geo-fence and a second geo-fence based on the location information of the locker in which the package A is located.

After receiving the second delivery message of the package A that is sent by the server, the mobile phone may further create one or more geo-fences based on the location information of the locker that is carried in the second delivery message. For example, the mobile phone may create two geo-fences based on the location information of the locker. One geo-fence (which is referred to as the first geo-fence in this application) is used to remind a user to pick up a package from a locker when the user is relatively close to the locker, and the other geo-fence (which is referred to as the second geo-fence in this application) is used to remind a user to open a corresponding pickup box in a locker through one-tap in a mobile phone when the user is very close to the locker.

Figure 3B:
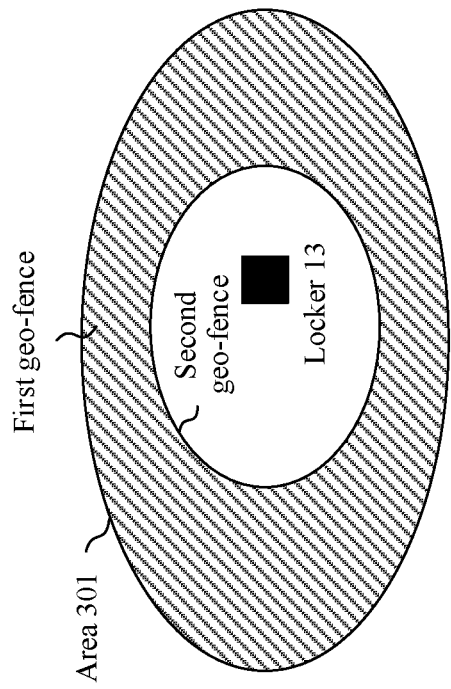
FIG. 3(a) and FIG. 3(b) are a schematic architectural diagram 3 of a delivery message system according to an embodiment.
Figure 3A:
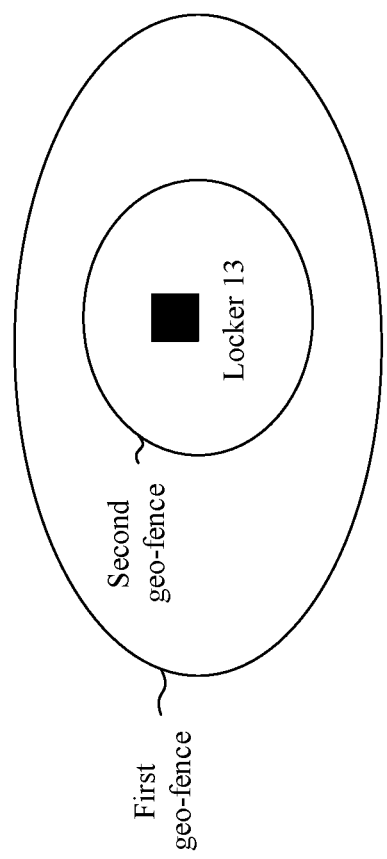

When approaching the locker, the user usually first enters the first geo-fence, and then enters the second geo-fence. Still as shown in FIG. 3(a), the area of the first geo-fence may include the area of the second geo-fence, and the locker is located in the overlapping area between the first geo-fence and the second geo-fence. Alternatively, as shown in FIG. 3(b), the area of the first geo-fence is an area in the area 301 other than the second geo-fence. In this case, the locker is located in the second geo-fence. In this application, the area of the second geo-fence that is relatively close to the locker may be referred to as a first area, and the area of the first geo-fence may be referred to as a second area. This is not limited in this embodiment of this application.

For example, the first geo-fence may be set to be far away from the locker by 200 to 500 meters, and the second geo-fence may be set to be far away from the locker within 20 meters. After creating the two geo-fences, the mobile phone may periodically detect location information of the mobile phone by using a location service function of the mobile phone, to determine whether the mobile phone enters the first geo-fence or the second geo-fence.

It should be noted that the first geo-fence and the second geo-fence are used as an example for description in this embodiment. It can be understood that the mobile phone may alternatively create only one geo-fence (for example, the first geo-fence or the second geo-fence) based on the location information of the locker that is carried in the second delivery message. This is not limited in this embodiment of this application.

In addition, in this embodiment of this application, after the mobile phone receives the second delivery message of the package A that is sent by the server, a sequence of performing step S1103 and step S1104 is not limited.

S1105: When the mobile phone detects that the mobile phone is located in the first geo-fence, the mobile phone displays a pickup reminder of the package A.

Figure 14:
FIG. 14 is a schematic scenario diagram 2 of a method for controlling a locker based on a delivery message according to an embodiment.

Because a distance between the first geo-fence and the locker 001 is greater than a distance between the second geo-fence and the locker 001, the user usually first enters the first geo-fence when the user moves carrying the mobile phone. For example, the package A is placed in the locker 001 in a community, and the mobile phone gradually approaches the locker 001 as the user moves after work. If the mobile phone detects that the mobile phone is located in the first geo-fence, to prevent the user from forgetting to pick up the package A from the locker 001, as shown in FIG. 14, the mobile phone may display a pickup reminder 1301 of the package A, to remind the user to pick up the package as soon as possible.

For example, similar to the foregoing pickup notification, the pickup reminder may be displayed on the lock screen, the pull-up menu, the drop-down menu, or the message notification bar. This is not limited in this embodiment of this application. In addition, content in the pickup reminder may be the same as or different from that in the foregoing pickup notification. For example, the pickup reminder displayed by the mobile phone may also include the delivery pickup code of the package A.

After the mobile phone displays the pickup reminder 1301, if the mobile phone detects that the user taps the pickup reminder 1301, or the mobile phone detects that the user unlocks a screen of the mobile phone, it indicates that the user has viewed the pickup reminder 1301. In this case, to prevent the user from being disturbed by repeatedly displaying the pickup reminder 1301, even if the mobile phone still detects that the mobile phone is currently located in the first geo-fence subsequently, the mobile phone may not display the pickup reminder 1301.

Alternatively, when the mobile phone displays the pickup notification of the package A in step S1103, the mobile phone may further record a time T1 at which the pickup notification is displayed. In this case, in step S1105, when the mobile phone detects that the mobile phone is located in the first geo-fence, the mobile phone may determine, based on the recorded time T1, a time interval between the time at which the pickup notification is displayed and a time at which the mobile phone enters the first geo-fence. If the time interval is less than a preset value, it indicates that the mobile phone has displayed the pickup notification of the package A not long ago. In this case, if the pickup reminder of the package A is displayed, the user may be disturbed. Therefore, the mobile phone may temporarily not display the pickup reminder of the package A.

For example, when the mobile phone determines that the time interval between the time at which the pickup notification is displayed and the time at which the mobile phone enters the first geo-fence is less than the preset value, the mobile phone may temporarily not display the pickup reminder of the package A, and the mobile phone may start a timer with specific duration. When the timer expires, the mobile phone may display the pickup reminder of the package A. Alternatively, when the timer expires, the mobile phone may obtain current location information. If the mobile phone is currently located in the first geo-fence, the mobile phone may display the pickup reminder of the package A.

Certainly, when the mobile phone detects that the mobile phone is currently located in the first geo-fence, the mobile phone may also remind, in a manner of vibration, voice, or the like, the user to pick up the package A from the locker 001 as soon as possible. This is not limited in this embodiment of this application.

S1106: When the mobile phone detects that the mobile phone is located in the second geo-fence, the mobile phone displays a pickup function item of the package A.

The pickup function item may be specifically in a form of a button, a link, a component, a card, or the like. This is not limited in this embodiment of this application. For ease of description, an example in which a pickup button is used as a pickup function item is used for description in the following embodiments.

Figure 15:
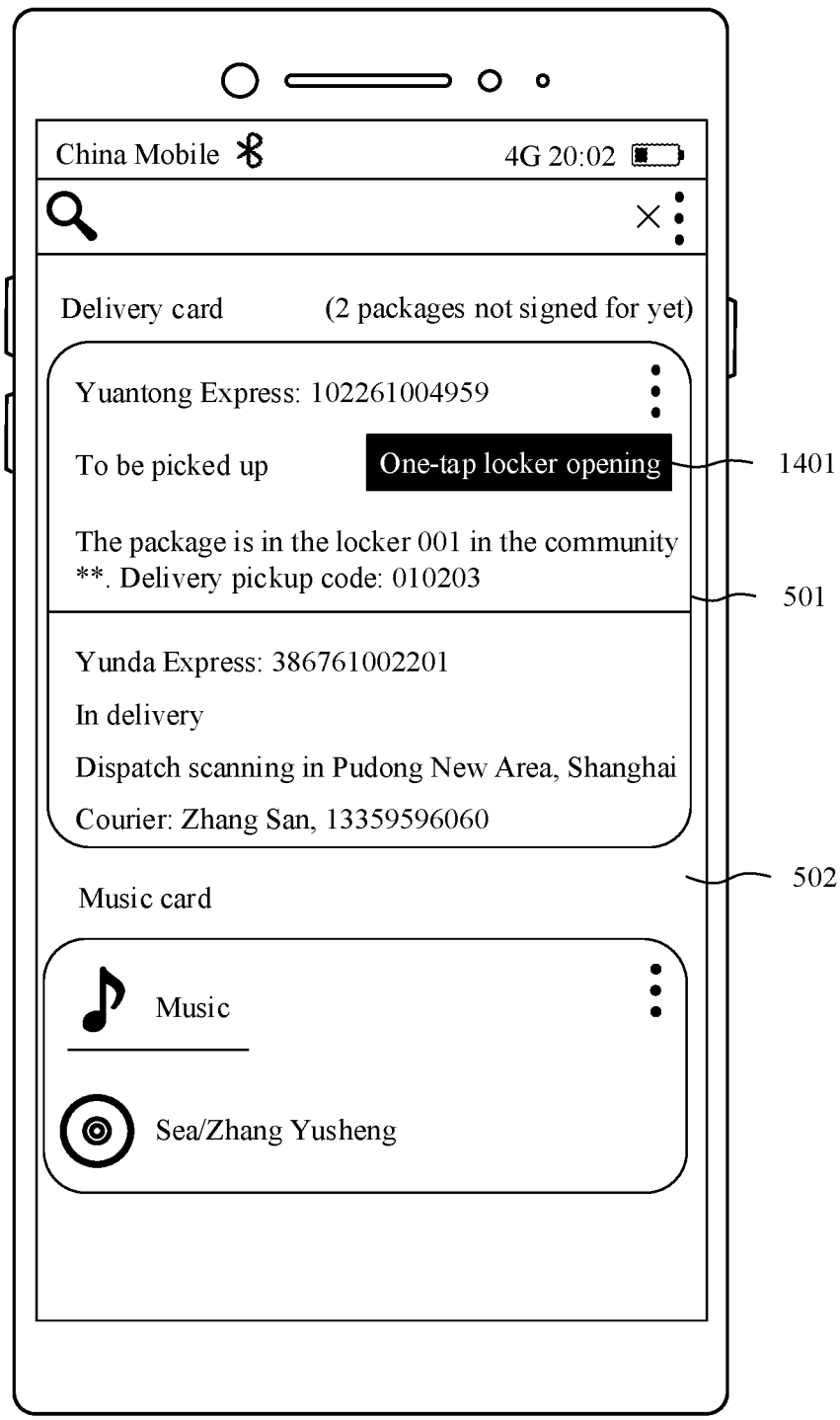
FIG. 15 is a schematic scenario diagram 3 of a method for controlling a locker based on a delivery message according to an embodiment.

When the mobile phone detects that the mobile phone is located in the second geo-fence that is closer to the locker 001, it indicates that the user has arrived near the locker 001 in which the package A is placed, and the package A is not picked by the user from the locker 001. In this case, as shown in FIG. 15, the mobile phone may display a pickup button 1401 in the displayed delivery card 501. The pickup button 1401 may be used to control to automatically open a pickup box in which the package A is placed in the locker 001. To be specific, after the user taps the pickup button 1401, a one-tap locker opening function can be implemented without manually entering the delivery pickup code in the locker 001. This simplifies an operation procedure in which a user picks up a package.

For example, when the mobile phone detects that the mobile phone enters the second geo-fence again, the mobile phone may display the pickup button 1401 in the delivery card 501. However, when the mobile phone does not enter the second geo-fence or leaves the second geo-fence, the mobile phone does not display the pickup button 1401 in the delivery card 501.

Alternatively, the pickup button 1401 may be always displayed in the delivery card 501. However, before the mobile phone detects that the mobile phone enters the second geo-fence, even if an operation that the user taps the pickup button 1401 is received, the mobile phone may not respond to the operation by one tap. For example, before the mobile phone detects that the mobile phone enters the second geo-fence, the mobile phone may display the pickup button 1401 in gray, to prompt the user that the current pickup button 1401 cannot perform human-machine interaction. After the mobile phone detects that the mobile phone enters the second geo-fence, the mobile phone may display the pickup button 1401 in green, to prompt the user to tap the pickup button 1401 to implement a one-tap locker opening function.

In this way, the user cannot trigger the pickup button 1401 to implement the one-tap locker opening function when the user is not close to the locker 001, thereby avoiding a security risk caused by opening a corresponding pickup box in the locker 001 when the user is relatively far away from the locker 001.

Figure 16A:
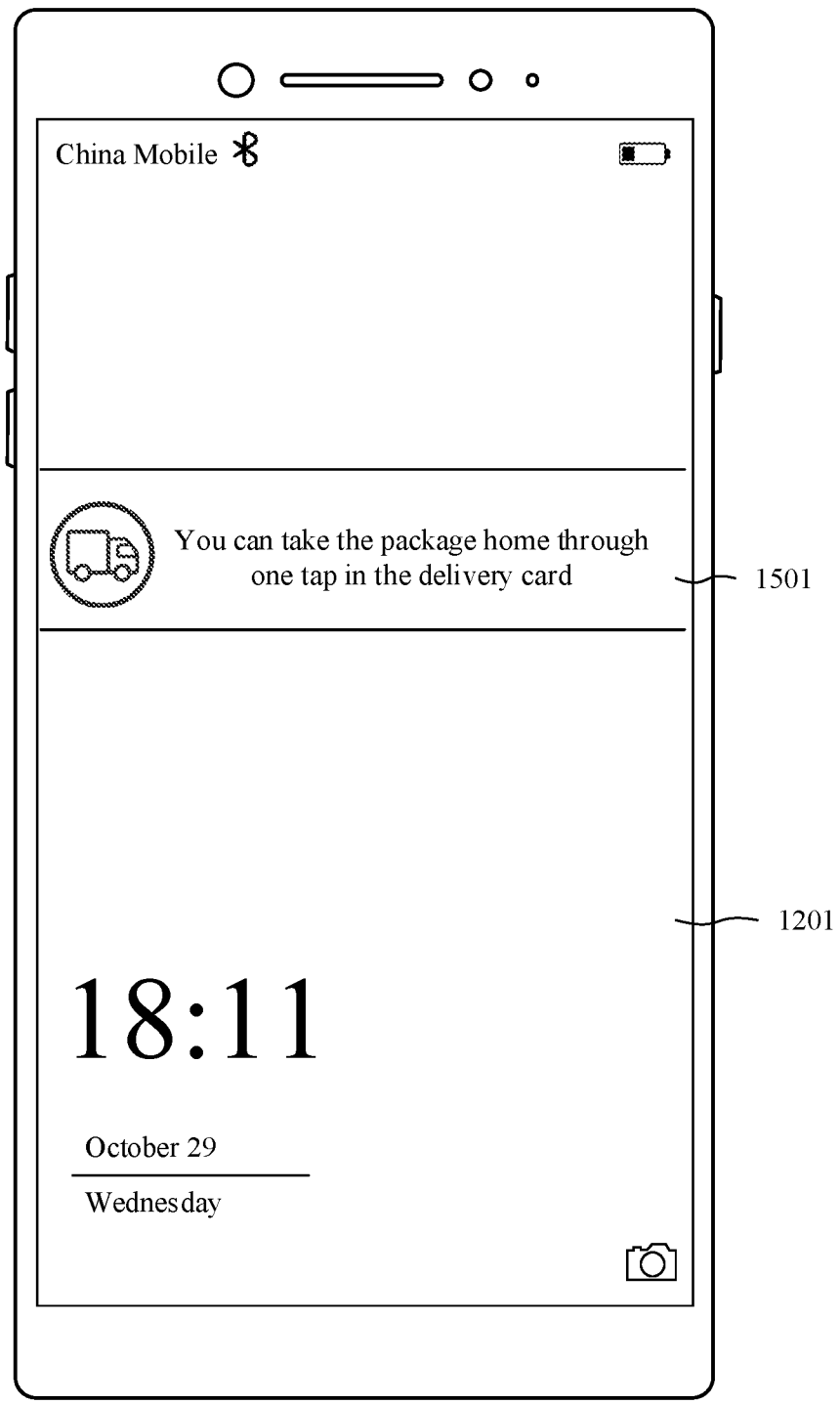
FIG. 16(a) and FIG. 16(b) are a schematic scenario diagram 4 of a method for controlling a locker based on a delivery message according to an embodiment.
Figure 16B:
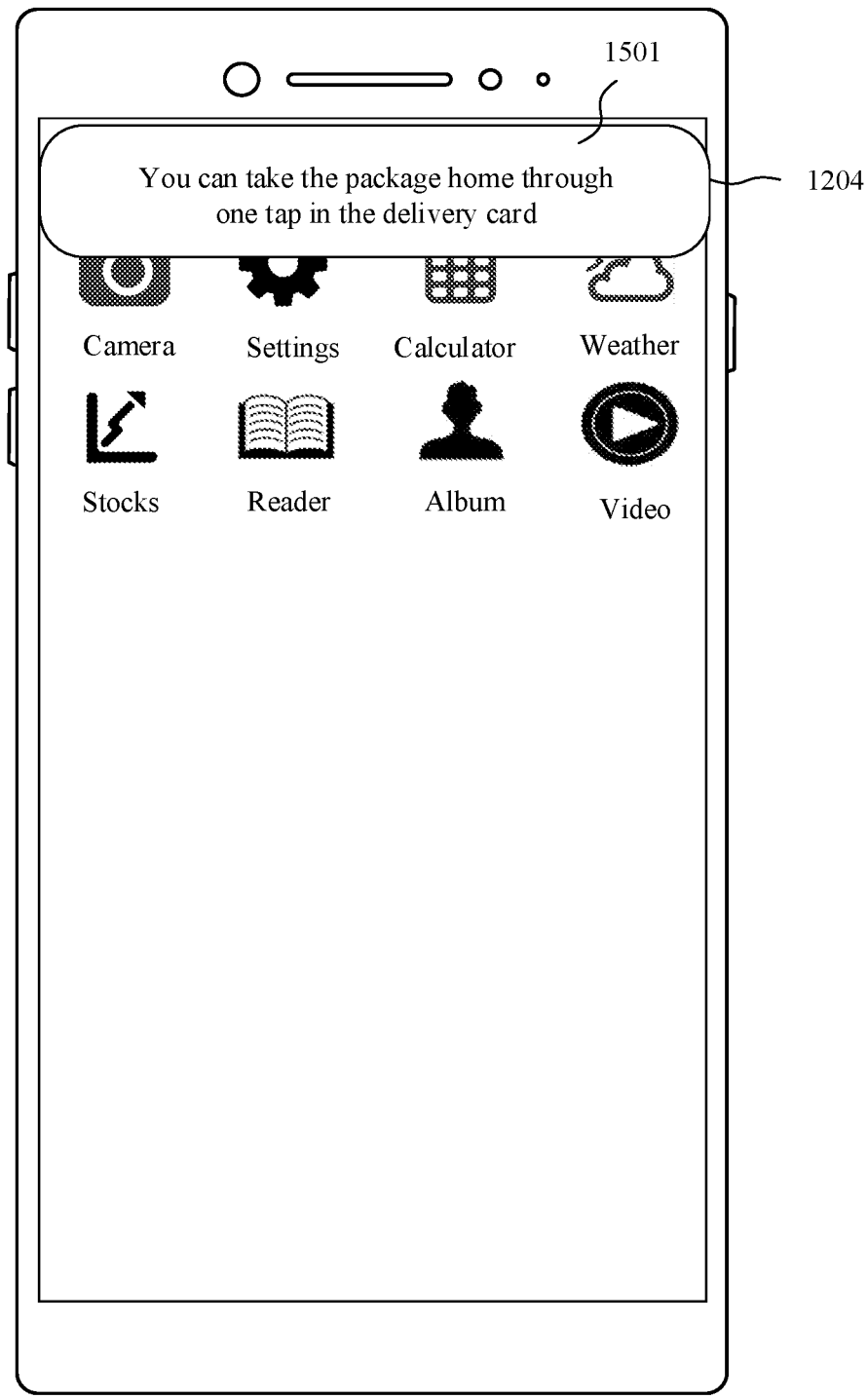

In addition, when the mobile phone detects that the mobile phone is located in the second geo-fence, if the mobile phone does not stay in the left-most screen 502 in which the delivery card 501 is located, the mobile phone may first display an automatic locker opening prompt. For example, if it is detected that the mobile phone is in a screen-off state or a screen-locked state when the mobile phone is located in the second geo-fence, as shown in FIG. 16(*a*), the mobile phone may display a lock screen 1201, and display an automatic locker opening prompt 1501 on the lock screen 1201, to prompt the user to trigger the pickup button 1401 in the delivery card 501. For another example, if it is detected that the mobile phone is running a desktop or another application when the mobile phone is located in the second geo-fence, as shown in FIG. 16(*b*), the mobile phone may display the automatic locker opening prompt 1501 in the message notification bar 1204. If the mobile phone detects that the user taps the automatic locker opening prompt 1501, the mobile phone may jump to the left-most screen 502 shown in FIG. 15, and display the pickup button 1401 in the left-most screen 502.

Alternatively, if the second geo-fence is located in the first geo-fence, when it is detected that the mobile phone is located in the second geo-fence, the mobile phone is also located in the first geo-fence. In this case, the mobile phone may not only display the pickup button 1401 or the automatic locker opening prompt 1501, but also display the pickup reminder of the package A. Alternatively, the mobile phone may preset a priority of the second geo-fence to be higher than a priority of the first geo-fence. In this way, when it is detected that the mobile phone is located in both the first geo-fence and the second geo-fence, the mobile phone may preferentially display the pickup button 1401 or the automatic locker opening prompt 1501 of the package A based on the foregoing priority relationship, and may not display the pickup reminder of the package A.

Certainly, the mobile phone may alternatively set the pickup button on the desktop, the lock screen, or the message notification bar. This is not limited in this embodiment of this application. Regardless of a location of the pickup button, if the mobile phone detects that the user taps the pickup button, the mobile phone may continue to perform steps S1107 to S1109.

S1107: When the mobile phone detects that the user taps the pickup function item, the mobile phone sends a locker opening request to the server.

In step S1107, if the mobile phone detects that the user taps the pickup button, it indicates that the user expects to open the pickup box 002 in the locker 001 to pick up the package A. In this case, the mobile phone may send the locker opening request to the server. The locker opening request may include the pickup information of the package A that is sent by the server to the mobile phone in step S1102, for example, the identifier of the locker, the identifier of the pickup box, and the delivery pickup code.

In addition, the locker opening request may further include at least one of the mobile phone identifier and the mobile phone number registered by the mobile phone in step S701, and the authentication information that is sent by the server and received by the mobile phone in step S706. Based on the information, the server may perform authentication on a user who sends the locker opening request.

Figure 17:
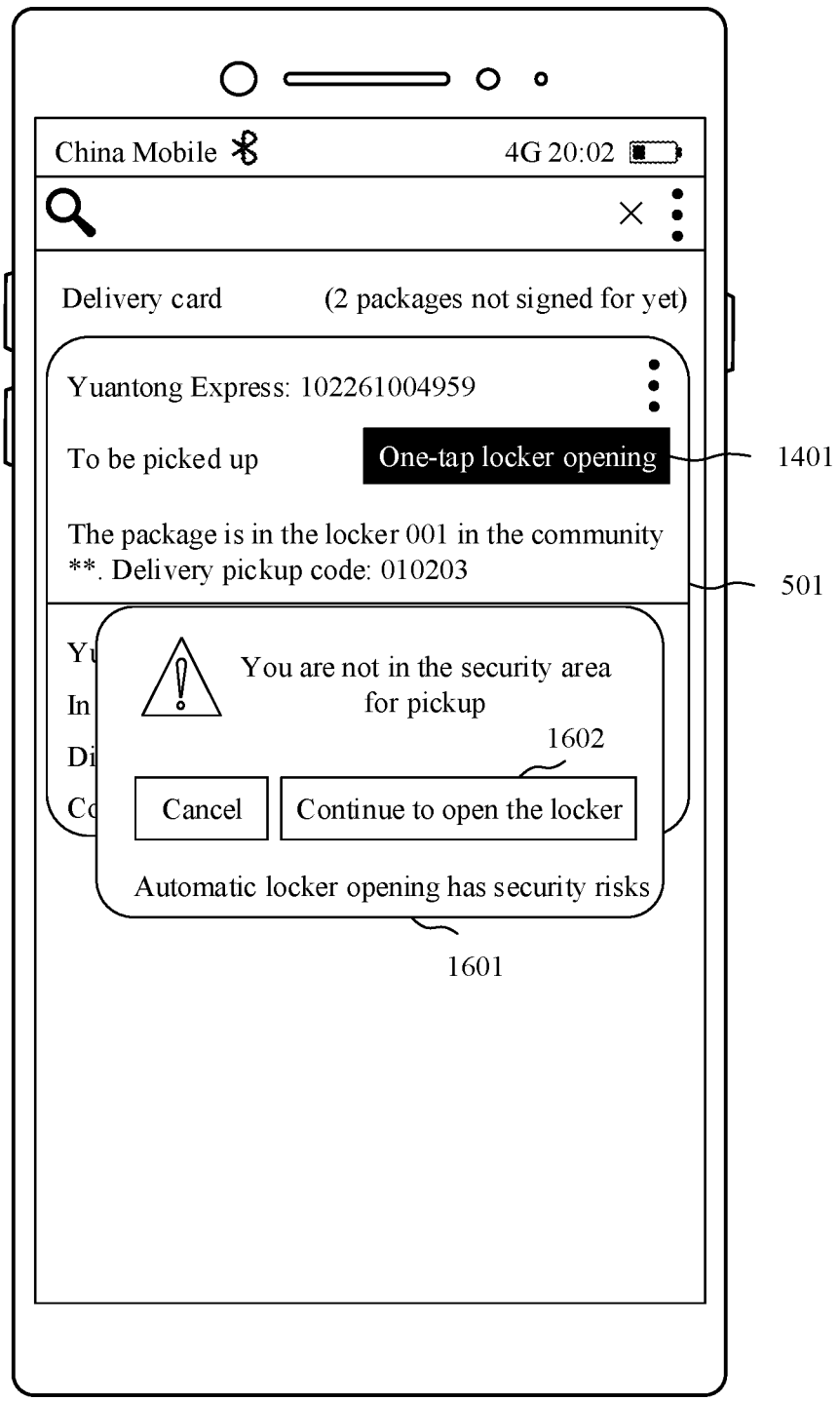
FIG. 17 is a schematic scenario diagram 5 of a method for controlling a locker based on a delivery message according to an embodiment.

In this embodiment, when the mobile phone detects that the user taps the pickup button, the mobile phone may further actively obtain current location information of the mobile phone. If the mobile phone is currently located in the second geo-fence, the mobile phone may send the locker opening request to the server. If the mobile phone is currently not located in the second geo-fence, it indicates that the user is already far away from the locker 001. In this case, to ensure security of the package A in the locker 001, the mobile phone does not need to send the locker opening request to the server in response to the operation that the user taps the pickup button. For example, as shown in FIG. 17, the mobile phone may further display a warning 1601 indicating a relatively high locker opening risk. The user may tap the pickup button again after entering the second geo-fence, or the user may tap a button 1602 for continuing to open the locker. If it is detected that the user taps the button 1602 for continuing to open the locker, it indicates that the user is willing to bear the risk of opening the locker. In this case, the mobile phone may send the locker opening request to the server.

It can be learned that, in this embodiment of this application, before the one-tap locker opening function is implemented, verification needs to be performed on a geographical location of the mobile phone that sends the locker opening request. When the mobile phone is close enough to a to-be-opened locker, there is a relatively low risk at which a package is lost by opening the locker. In this case, the mobile phone may send the locker opening request to the server. However, when a distance between the mobile phone and the locker does not meet a preset condition, the mobile phone does not need to send the locker opening request to the server, to ensure security of a package to be picked up.

S1108: In response to the locker opening request, the server controls the locker to open the pickup box of the package A.

After receiving the locker opening request sent by the mobile phone, the server may first perform, based on the mobile phone number, the mobile phone identifier, and the authentication information that are carried in the locker opening request, identity authentication on the user who sends the locker opening request. When each authorized registered user registers the delivery reminder service, the server pre-stores a correspondence between a mobile phone number, a mobile phone identifier, and authentication information. Therefore, if it is detected that the mobile phone number, the mobile phone identifier, and the authentication information that are carried in the locker opening request are the same as a mobile phone number, a mobile phone identifier, and authentication information that are in a specific pre-stored correspondence, it indicates that the user who sends the locker opening request is an authorized registered user. Otherwise, the server may determine that the user who sends the locker opening request is an unauthorized user. In this case, the server may discard the locker opening request.

If the user who sends the locker opening request is an authorized registered user, the server may generate a locker opening instruction based on the pickup information carried in the locker opening request, and send the locker opening instruction to a corresponding locker. The corresponding locker performs a locker opening operation in response to the locker opening instruction. For example, the pickup information carried in the locker opening request includes an identifier 001 of a locker, an identifier 002 of a pickup box, and a delivery pickup code 010203. In this case, the server may add the identifier 002 of the pickup box and the delivery pickup code 010203 to the locker opening instruction, and send the locker opening instruction to the locker identified as 001. In this way, the locker identified as 001 may open the pickup box 002 based on the received identifier 002 of the pickup box and the delivery pickup code 010203. Therefore, the user can open the pickup box 002 by one-tapping the pickup button, to pick up the package A. This simplifies a pickup procedure in which a user uses a locker to pick up a package.

It should be noted that the server that controls the locker to open the pickup box in step S1108 may be the same as or may be different from the server that interacts with the mobile phone in steps S1102 and S1107. For example, a first server may be configured to implement service interaction with a mobile phone, and a second server may be configured to implement service interaction with a locker. For example, the first server may send the delivery message of the package to be picked up to the mobile phone in step S1102, or may receive, in step S1107, the locker opening request sent by the mobile phone. After receiving the locker opening request sent by the mobile phone, the first server may forward the locker opening request to the second server. In response to the locker opening request, the second server controls the locker to open a corresponding pickup box. Certainly, when receiving a delivery message uploaded by the courier, the second server may also send the delivery message to the first server. This is not limited in this embodiment of this application.

S1109: The mobile phone deletes the first geo-fence and the second geo-fence.

For example, after the locker 001 performs the locker opening operation in response to the locker opening instruction sent by the server, if the locker 001 successfully opens the pickup box 002 in the locker opening instruction, the locker 001 may send a locker opening success response message 1 to the server. After receiving the locker opening success response message 1, the server may send the response message 1 to the mobile phone that sends the locker opening request.

Figure 18:
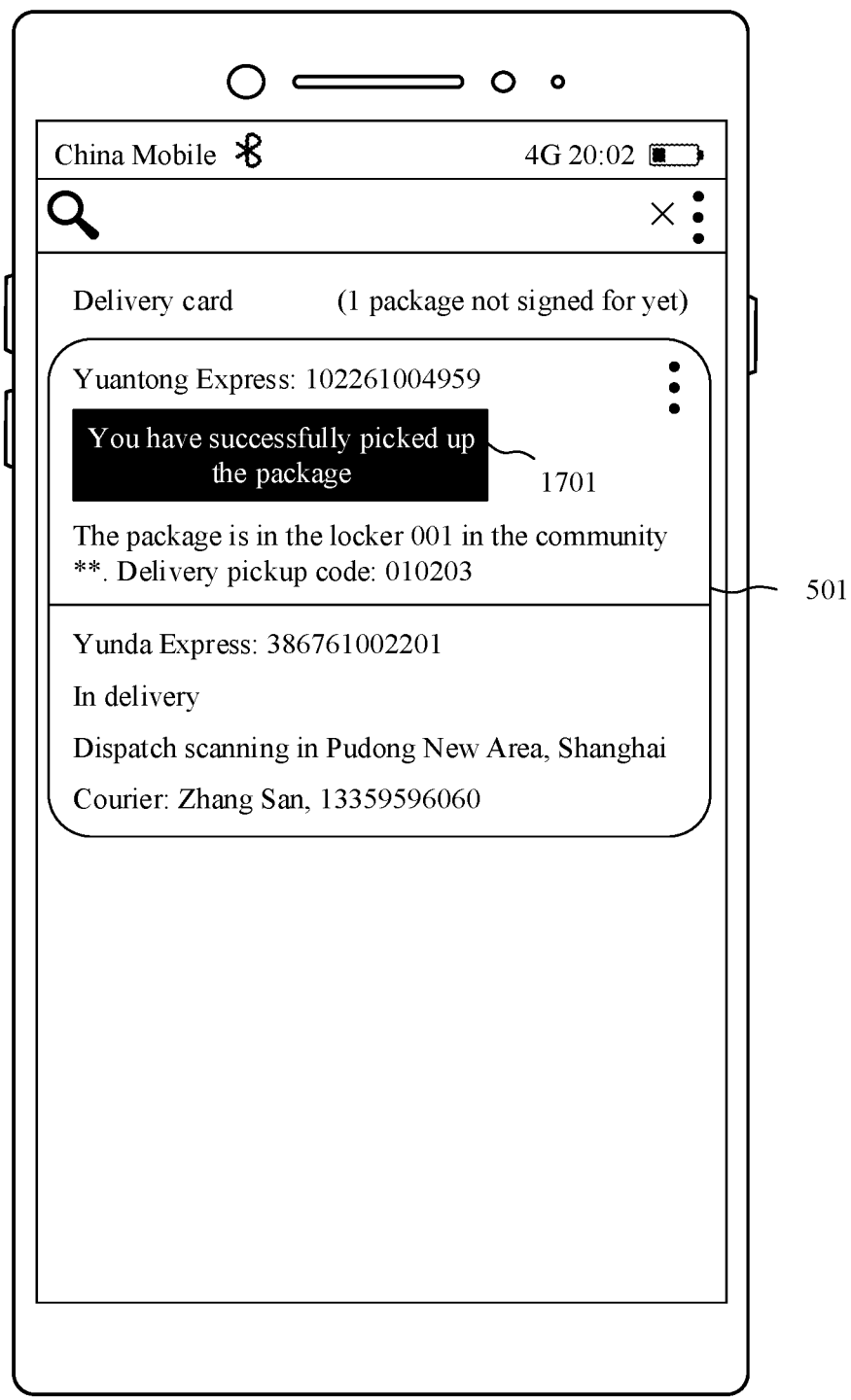
FIG. 18 is a schematic scenario diagram 6 of a method for controlling a locker based on a delivery message according to an embodiment.

In this case, as shown in FIG. 18, the mobile phone may display, in the delivery card 501, a prompt 1701 indicating that the package A is successfully picked up. In addition, the mobile phone may further delete the first geo-fence and the second geo-fence that are created in step S1104, to prevent the user from being disturbed when the mobile phone is triggered to display the pickup reminder or the pickup button because the mobile phone subsequently re-enters the first geo-fence or the second geo-fence.

Correspondingly, if the locker 001 fails to open the pickup box 002 in the foregoing locker opening instruction, the locker 001 may send a locker opening failure response message 2 to the server. After receiving the locker opening failure response message 2, the server may also send the response message 2 to the mobile phone that sends the locker opening request. Because the pickup box 002 is not successfully opened, the user fails to pick up the package A. Therefore, the mobile phone does not need to delete the first geo-fence or the second geo-fence. In addition, the mobile phone may continue to perform steps S1105 to S1108. Until the mobile phone receives the locker opening success response message 1, the mobile phone may delete the first geo-fence and the second geo-fence that are set for the package A.

Figure 19:
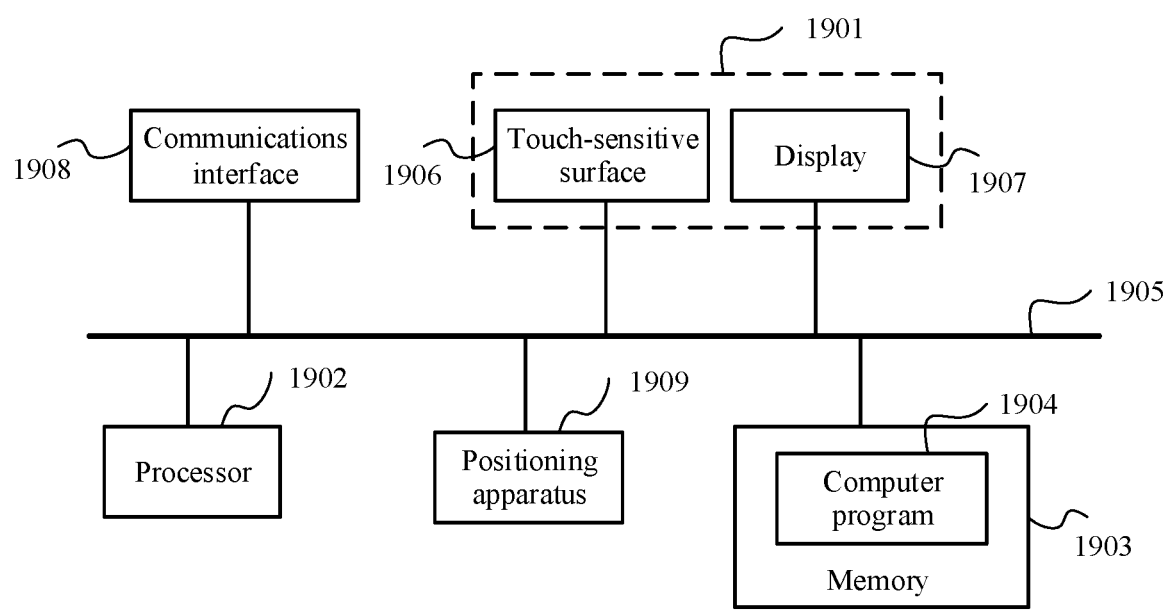
FIG. 19 is a schematic structural diagram 2 of an electronic device according to an embodiment.

As shown in FIG. 19, an embodiment of this application discloses an electronic device, including: a touchscreen 1901, where the touchscreen 1901 includes a touch-sensitive surface 1906 and a display 1907; one or more processors 1902; a memory 1903; a communications interface 1908; a positioning apparatus 1909; one or more applications (not shown); and one or more computer programs 1904. The foregoing components may be connected by using one or more communications buses 1905. The one or more computer programs 1904 are stored in the memory 1903 and are executed by the one or more processors 1902. The one or more computer programs 1904 include an instruction, and the instruction may be used to perform the steps in the corresponding embodiment in FIG. 8 or FIG. 12.

The foregoing descriptions about the implementations allow a person skilled in the art to clearly understand that, for the purpose of convenient and brief description, division of the foregoing function modules is used as an example for illustration. During actual application, the foregoing functions may be allocated to different function modules based on requirements for implementation. To be specific, an inner structure of an apparatus is divided into different function modules to implement all or some of the functions described above. For a detailed working process of the foregoing system, apparatus, and unit, refer to a corresponding process in the foregoing method embodiments. Details are not described herein again.

The function units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable-readable storage medium. Based on such an understanding, the technical solutions of the embodiments of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes any medium that can store program code, such as a USB flash drive, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A method for controlling a locker based on a delivery message, comprising:
   obtaining, by an electronic device, a delivery message of a first package sent by a server, wherein the delivery message comprises pickup information of the first package and location information of a locker in which the first package is placed, and the pickup information is configured for opening a pickup box in which the first package is placed in the locker;
   determining, by the electronic device, a first area based on the location information, wherein the locker is located in the first area;
   displaying, by the electronic device, a pickup function item when it is detected that the electronic device enters the first area; and
   sending, by the electronic device, a locker opening request to the server when it is detected that a user triggers the pickup function item, wherein the locker opening request comprises the pickup information of the first package, and the pickup information is configured for opening the pickup box in which the first package is placed in the locker.

2. The method according to claim 1, wherein the pickup function item is a pickup button, and the pickup button is located in a left-most screen, a lock screen, a message notification bar, a pull-up menu, or a drop-down menu.

3. The method according to claim 1, wherein after it is detected that the electronic device enters the first area, the method further comprises:
   displaying, by the electronic device, an automatic locker opening prompt if the electronic device does not display a locker opening interface, wherein the locker opening interface comprises the pickup function item; and, wherein
   displaying, by the electronic device, the pickup function item comprises:

switching, by the electronic device, to the locker opening interface when it is detected that the user enters a preset operation for the automatic locker opening prompt.

4. The method according to claim 1, wherein after displaying, by the electronic device, the pickup function item, the method further comprises:
   when it is detected that the electronic device leaves the first area, hiding, by the electronic device, the pickup function item; and
   when it is detected that the electronic device leaves the first area, setting, by the electronic device, the pickup function item to a state in which the electronic device cannot interact with the user.

5. The method according to claim 1, wherein after it is detected that the user enters a preset operation for the pickup function item, the method further comprises:
   obtaining, by the electronic device, current location information of the electronic device; and, wherein
   sending, by the electronic device, the locker opening request to the server comprises:
   sending, by the electronic device, the locker opening request to the server if the electronic device is currently located in the first area.

6. The method according to claim 5, wherein after obtaining, by the electronic device, the current location information of the electronic device, the method further comprises:
   displaying, by the electronic device, warning information if the current location information of the electronic device is outside the first area, wherein the warning information is configured for prompting the user with a risk of opening the pickup box in which the first package is located.

7. The method according to claim 1, wherein after obtaining, by the electronic device, the delivery message of a first package that is sent by the server, the method further comprises:
   determining, by the electronic device, a range of a second area based on the location information, wherein the locker is located in the second area, the second area comprises the first area, or the second area is an area in a third area other than the first area, and the third area comprises the first area; and
   displaying, by the electronic device, a pickup reminder when it is detected that the electronic device enters the second area, wherein the pickup reminder is used to prompt the user to pick up the first package.

8. The method according to claim 7, wherein after displaying, by the electronic device, the pickup reminder, the method further comprises:
   when it is detected that the electronic device enters the second area again, determining, by the electronic device, whether the pickup reminder is operated; and
   if the pickup reminder is operated, ceasing to display, by the electronic device, the pickup reminder; and
   if the pickup reminder is not operated, displaying, by the electronic device, the pickup reminder again.

9. The method according to claim 7, wherein after obtaining, by the electronic device, the delivery message of a first package that is sent by a server, the method further comprises:
   displaying, by the electronic device, a pickup notification of the first package based on the delivery message.

10. The method according to claim 9, wherein when it is detected that the electronic device enters the second area, the method further comprises:
    determining, by the electronic device, a time interval between a moment at which the pickup notification is displayed and a moment at which the electronic device enters the second area; and
    the displaying, by the electronic device, a pickup reminder comprises:
    if the time interval is greater than a preset value, displaying, by the electronic device, the pickup reminder; and
    if the time interval is less than or equal to the preset value, displaying, by the electronic device, the pickup reminder after a preset time.

11. The method according to claim 9, wherein the electronic device is provided with a function of a delivery card, and the delivery card is configured to display a delivery message of a recipient that is registered by the user; and, wherein after displaying, by the electronic device, the pickup notification of the first package based on the delivery message, the method further comprises:
    when it is detected that the user enters a preset operation for the pickup notification, switching, by the electronic device, to an interface comprising the delivery card.

12. An electronic device, comprising:
    a touchscreen, wherein the touchscreen comprises a touch-sensitive surface and a display;
    a communications interface;
    a positioning apparatus;
    one or more processors;
    one or more memories; and
    one or more computer programs, wherein the one or more computer programs are stored in the one or more memories;
    the communications interface is configured to obtain a delivery message of a first package sent by a server, wherein the delivery message comprises pickup information of the first package and location information of a locker in which the first package is placed, and the pickup information is configured for opening a pickup box in which the first package is placed in the locker;
    the processor is configured to determine a first area based on the location information, wherein the locker is located in the first area;
    the touchscreen is configured to display a pickup function item when the electronic device enters the first area; and
    the communications interface is further configured to send a locker opening request to the server when a user triggers the pickup function item, wherein the locker opening request comprises the pickup information of the first package, and the pickup information is configured for opening the pickup box in which the first package is placed in the locker.

13. The electronic device according to claim 12, wherein the touchscreen is further configured to:
    display an automatic locker opening prompt if the electronic device does not display a locker opening interface, wherein the locker opening interface comprises the pickup function item; and
    switch to the locker opening interface when the user enters a preset operation for the automatic locker opening prompt.

14. The electronic device according to claim 12, wherein the processor is further configured to: when the electronic device leaves the first area, hide the pickup function item on the touchscreen; or when the electronic device leaves the first area, set the pickup function item to a state in which the electronic device cannot interact with the user.

15. The electronic device according to claim 12, wherein the positioning apparatus is configured to obtain current location information of the electronic device; and
the processor is further configured to: determine whether the current location information of the electronic device is in the first area; and indicate the communications interface to send the locker opening request to the server if the current location information of the electronic device is in the first area.

16. The electronic device according to claim 15, wherein the touchscreen is further configured to display warning information if the current location information of the electronic device is outside the first area, wherein the warning information is configured for prompting the user with a risk of opening the pickup box in which the first package is located.

17. The electronic device according to claim 12, wherein the processor is further configured to determine a range of a second area based on the location information, wherein the locker is located in the second area, the second area comprises the first area, or the second area is an area in a third area other than the first area, and the third area comprises the first area; and
the touchscreen is further configured to display a pickup reminder when the electronic device enters the second area, wherein the pickup reminder is used to prompt the user to pick up the first package.

18. The electronic device according to claim 17, wherein the processor is further configured to: when the electronic device enters the second area again, determine whether the pickup reminder is operated;
if the pickup reminder is operated, cease to display the pickup reminder; and
if the pickup reminder is not operated, indicate the touchscreen to display the pickup reminder again.

19. The electronic device according to claim 17, wherein the touchscreen is further configured to display a pickup notification of the first package based on the delivery message.

20. A non-transitory computer-readable storage medium, wherein the computer-readable storage medium stores an instruction, and when the instruction is run on an electronic device, the electronic device is enabled to perform the method for controlling a locker based on a delivery message according to claim 1.

* * * * *